(12) United States Patent
Ehrlicher et al.

(10) Patent No.: US 12,339,231 B2
(45) Date of Patent: Jun. 24, 2025

(54) METHOD AND DEVICE FOR MEASURING CELL CONTRACTILITY

(71) Applicant: THE ROYAL INSTITUTION FOR THE ADVANCEMENT OF LEARNING/MCGILL UNIVERSITY, Montréal (CA)

(72) Inventors: Allen Ehrlicher, Montreal (CA); Ali Amini Harandi, Montréal (CA); Ajinkya Ghagre, Montreal (CA)

(73) Assignee: THE ROYAL INSTITUTION FOR THE ADVANCEMENT OF LEARNING / MCGILL UNIVERSITY, Montréal (CA)

( * ) Notice: Subject to any disclaimer, the term of this patent is extended or adjusted under 35 U.S.C. 154(b) by 482 days.

(21) Appl. No.: 17/731,285

(22) Filed: Apr. 28, 2022

(65) Prior Publication Data

US 2022/0349825 A1    Nov. 3, 2022

Related U.S. Application Data

(60) Provisional application No. 63/182,065, filed on Apr. 30, 2021.

(51) Int. Cl.
*G01N 21/64* (2006.01)
*G06T 7/00* (2017.01)

(52) U.S. Cl.
CPC ..... *G01N 21/6456* (2013.01); *G01N 21/6428* (2013.01); *G06T 7/0014* (2013.01); *G01N 2021/6439* (2013.01); *G06T 2207/10064* (2013.01); *G06T 2207/30024* (2013.01)

(58) Field of Classification Search
CPC .......... G01N 21/6456; G01N 21/6428; G01N 2021/6439; G01N 15/1433; G01N 2015/1497; G01N 15/1429; G01N 2015/1006; G06T 7/0014; G06T 2207/10064; G06T 2207/30024; G06T 2207/10056

See application file for complete search history.

(56) References Cited

PUBLICATIONS

Polacheck, W.J. and Chen, C.S., 2016. Measuring cell-generated forces: a guide to the available tools. Nature methods, 13(5), pp. 415-423.*

Holenstein, C.N., Horvath, A., Schär, B. and Schoenenberger, A.D., The Relationship Between Metastatic Potential and In Vitro Mechanical Properties of. Soft Matter, 8, p. 673.*

(Continued)

*Primary Examiner* — Zhitong Chen
(74) *Attorney, Agent, or Firm* — NORTON ROSE FULBRIGHT CANADA LLP

(57) ABSTRACT

The method can include: acquiring an image of an arrangement having at least one cell covering at least one adhesive surface area, the at least one adhesive surface area being predictively deformable upon exerting cellular forces stemming from said at least one cell; measuring, from the image, a surface area of the at least one cell; comparing the measured surface area to a reference surface area value; and generating a signal indicative of the cellular forces based on said comparison.

20 Claims, 13 Drawing Sheets

(56) References Cited

PUBLICATIONS

Banda, O.A., Sabanayagam, C.R. and Slater, J.H., 2019. Reference-free traction force microscopy platform fabricated via two-photon laser scanning lithography enables facile measurement of cell-generated forces. ACS applied materials & interfaces, 11 (20), pp. 18233-18241.*

Hur, S.S., Zhao, Y., Li, Y.S., Botvinick, E. and Chien, S., 2009. Live cells exert 3-dimensional traction forces on their substrata. Cellular and molecular bioengineering, 2, pp. 425-436.*

Makarchuk, S., Beyer, N., Gaiddon, C., Grange, W., & Hébraud, P. (2018). Holographic traction force microscopy. Scientific reports, 8(1), 1-11.

Polio, S. R., Stasiak, S. E., Jamieson, R. R., Balestrini, J. L., Krishnan, R., & Parameswaran, H. (2019). Extracellular matrix stiffness regulates human airway smooth muscle contraction by altering the cell-cell coupling. Scientific reports, 9(1), 1-12.

Wang, X., Hu, X., Dulińska-Molak, I., Kawazoe, N., Yang, Y., & Chen, G. (2016). Discriminating the independent influence of cell adhesion and spreading area on stem cell fate determination using micropatterned surfaces. Scientific reports, 6(1), 1-13.

Vogel, V., & Sheetz, M. (2006). Local force and geometry sensing regulate cell functions. Nature reviews Molecular cell biology, 7(4), 265-275.

Wang, N., Tytell, J. D., & Ingber, D. E. (2009). Mechanotransduction at a distance: mechanically coupling the extracellular matrix with the nucleus. Nature reviews Molecular cell biology, 10(1), 75-82.

Versaevel, M., Grevesse, T., & Gabriele, S. (2012). Spatial coordination between cell and nuclear shape within micropatterned endothelial cells. Nature communications, 3(1), 1-11.

Zhang, Y., Ge, C., Zhu, C., & Salaita, K. (2014). DNA-based digital tension probes reveal integrin forces during early cell adhesion. Nature communications, 5(1), 1-10.

Bergert, M., Lendenmann, T., Zundel, M., Ehret, A. E., Panozzo, D., Richner, P., . . . & Ferrari, A. (2016). Confocal reference free traction force microscopy. Nature communications, 7(1), 1-10.

Liu, Y., Medda, R., Liu, Z., Galior, K., Yehl, K., Spatz, J. P., . . . & Salaita, K. (2014). Nanoparticle tension probes patterned at the nanoscale: impact of integrin clustering on force transmission. Nano letters, 14(10), 5539-5546.

Morimatsu, M., Mekhdjian, A. H., Adhikari, A. S., & Dunn, A. R. (2013). Molecular tension sensors report forces generated by single integrin molecules in living cells. Nano letters, 13(9), 3985-3989.

Sadd, M. H. (2009). Elasticity: theory, applications, and numerics. Academic Press.

Fu, J., Wang, Y. K., Yang, M. T., Desai, R. A., Yu, X., Liu, Z., & Chen, C. S. (2010). Mechanical regulation of cell function with geometrically modulated elastomeric substrates. Nature methods, 7(9), 733-736.

Legant, W. R., Miller, J. S., Blakely, B. L., Cohen, D. M., Genin, G. M., & Chen, C. S. (2010). Measurement of mechanical tractions exerted by cells in three-dimensional matrices. Nature methods, 7(12), 969.

Blakely, B. L., Dumelin, C. E., Trappmann, B., McGregor, L. M., Choi, C. K., Anthony, P. C., . . . & Chen, C. S. (2014). A DNA-based molecular probe for optically reporting cellular traction forces. Nature methods, 11(12), 1229-1232.

Pushkarsky, I., Tseng, P., Black, D., France, B., Warfe, L., Koziol-White, C. J., . . . & Di Carlo, D. (2018). Elastomeric sensor surfaces for high-throughput single-cell force cytometry. Nature biomedical engineering, 2(2), 124-137.

Sabass, B., Gardel, M. L., Waterman, C. M., & Schwarz, U. S. (2008). High resolution traction force microscopy based on experimental and computational advances. Biophysical journal, 94(1), 207-220.

Albert, P. J., & Schwarz, U. S. (2014). Dynamics of cell shape and forces on micropatterned substrates predicted by a cellular Potts model. Biophysical journal, 106(11), 2340-2352.

Oakes, P. W., Banerjee, S., Marchetti, M. C., & Gardel, M. L. (2014). Geometry regulates traction stresses in adherent cells. Biophysical journal, 107(4), 825-833.

Yoshie, H., Koushki, N., Kaviani, R., Tabatabaei, M., Rajendran, K., Dang, Q., . . . & Ehrlicher, A. J. (2018). Traction force screening enabled by compliant PDMS elastomers. Biophysical journal, 114(9), 2194-2199.

Dembo, M., Oliver, T., Ishihara, A., & Jacobson, K. (1996). Imaging the traction stresses exerted by locomoting cells with the elastic substratum method. Biophysical journal, 70(4), 2008-2022.

Dembo, M., & Wang, Y. L. (1999). Stresses at the cell-to-substrate interface during locomotion of fibroblasts. Biophysical journal, 76(4), 2307-2316.

Plotnikov, S. V., Pasapera, A. M., Sabass, B., & Waterman, C. M. (2012). Force fluctuations within focal adhesions mediate ECM-rigidity sensing to guide directed cell migration. Cell, 151(7), 1513-1527.

Polacheck, W. J., & Chen, C. S. (2016). Measuring cell-generated forces: a guide to the available tools. Nature methods, 13(5), 415-423.

Kraning-Rush, C. M., Califano, J. P., & Reinhart-King, C. A. (2012). Cellular traction stresses increase with increasing metastatic potential. PloS one, 7(2), e32572.

Toro-Nahuelpan, M., Zagoriy, I., Senger, F., Blanchoin, L., Thery, M., & Mahamid, J. (2020). Tailoring cryo-electron microscopy grids by photo-micropatterning for in-cell structural studies. Nature methods, 17(1), 50-54.

Koushki, N., Ghagre, A., Srivastava, L. K., Sitaras, C., Yoshie, H., Molter, C., & Ehrlicher, A. (2020). Lamin A redistribution mediated by nuclear deformation determines dynamic localization of YAP. BioRxiv.

Kilian, K. A., Bugarija, B., Lahn, B. T., & Mrksich, M. (2010). Geometric cues for directing the differentiation of mesenchymal stem cells. Proceedings of the National Academy of Sciences, 107(11), 4872-4877.

Ghassemi, S., Meacci, G., Liu, S., Gondarenko, A. A., Mathur, A., Roca-Cusachs, P., . . . & Hone, J. (2012). Cells test substrate rigidity by local contractions on submicrometer pillars. Proceedings of the National Academy of Sciences, 109(14), 5328-5333.

Stubb, A., Laine, R. F., Miihkinen, M., Hamidi, H., Guzman, C., Henriques, R., . . . & Ivaska, J. (2020). Fluctuation-based super-resolution traction force microscopy. Nano letters, 20(4), 2230-2245.

Butler, J. P., Tolic-Nørrelykke, I. M., Fabry, B., & Fredberg, J. J. (2002). Traction fields, moments, and strain energy that cells exert on their surroundings. American Journal of Physiology-Cell Physiology, 282(3), C595-C605.

Sun, Y., Chen, C. S., & Fu, J. (2012). Forcing stem cells to behave: a biophysical perspective of the cellular microenvironment. Annual review of biophysics, 41, 519-542.

Przybyla, L., Muncie, J. M., & Weaver, V. M. (2016). Mechanical control of epithelial-to-mesenchymal transitions in development and cancer. Annual review of cell and developmental biology, 32, 527-554.

Wolfenson, H., Yang, B., & Sheetz, M. P. (2019). Steps in mechanotransduction pathways that control cell morphology. Annual review of physiology, 81, 585-605.

Ruiz, S. A., & Chen, C. S. (2007). Microcontact printing: A tool to pattern. Soft Matter, 3(2), 168-177.

Banda, O. A., Sabanayagam, C. R., & Slater, J. H. (2019). Reference-free traction force microscopy platform fabricated via two-photon laser scanning lithography enables facile measurement of cell-generated forces. ACS applied materials & interfaces, 11(20), 18233-18241.

Park, C. Y., Zhou, E. H., Tambe, D., Chen, B., Lavoie, T., Dowell, M., . . . & Krishnan, R. (2015). High-throughput screening for modulators of cellular contractile force. Integrative Biology, 7(10), 1318-1324.

Li, Z., Persson, H., Adolfsson, K., Abariute, L., Borgström, M. T., Hessman, D., . . . & Prinz, C. N. (2017). Cellular traction forces: a useful parameter in cancer research. Nanoscale, 9(48), 19039-19044.

(56) References Cited

PUBLICATIONS

Théry, M., Pépin, A., Dressaire, E., Chen, Y., & Bornens, M. (2006). Cell distribution of stress fibres in response to the geometry of the adhesive environment. Cell motility and the cytoskeleton, 63(6), 341-355.

Discher, D. E. (Sep. 2009). The foldome in cellular force transduction. In 2009 Annual International Conference of the IEEE Engineering in Medicine and Biology Society (pp. 3341-3342). IEEE.

Martino, F., Perestrelo, A. R., Vinarský, V., Pagliari, S., & Forte, G. (2018). Cellular mechanotransduction: from tension to function. Frontiers in physiology, 9, 824.

Hahn, C., & Schwartz, M. A. (2008). The role of cellular adaptation to mechanical forces in atherosclerosis. Arteriosclerosis, thrombosis, and vascular biology, 28(12), 2101-2107.

Ingber, D. (2003). Mechanobiology and diseases of mechanotransduction. Annals of medicine, 35(8), 564-577.

Jaalouk, D. E., & Lammerding, J. (2009). Mechanotransduction gone awry. Nature reviews Molecular cell biology, 10(1), 63-73.

Holenstein, C. N., Horvath, A., Schar, B., Schoenenberger, A. D., Bollhalder, M., Goedecke, N., . . . & Silvan, U. (2019). The relationship between metastatic potential and in vitro mechanical properties of osteosarcoma cells. Molecular biology of the cell, 30(7), 887-898.

Murrell, M., Oakes, P. W., Lenz, M., & Gardel, M. L. (2015). Forcing cells into shape: the mechanics of actomyosin contractility. Nature reviews Molecular cell biology, 16(8), 486-498.

Balaban, N. Q., Schwarz, U. S., Riveline, D., Goichberg, P., Tzur, G., Sabanay, I., . . . & Geiger, B. (2001). Force and focal adhesion assembly: a close relationship studied using elastic micropatterned substrates. Nature cell biology, 3(5), 466-472.

Li, Q., Makhija, E., Hameed, F. M., & Shivashankar, G. V. (2015). Micropillar displacements by cell traction forces are mechanically correlated with nuclear dynamics. Biochemical and biophysical research communications, 461(2), 372-377.

Legant, W. R., Choi, C. K., Miller, J. S., Shao, L., Gao, L., Betzig, E., & Chen, C. S. (2013). Multidimensional traction force microscopy reveals out-of-plane rotational moments about focal adhesions. Proceedings of the National Academy of Sciences, 110(3), 881-886.

Tan, J. L., Tien, J., Pirone, D. M., Gray, D. S., Bhadriraju, K., & Chen, C. S. (2003). Cells lying on a bed of microneedles: an approach to isolate mechanical force. Proceedings of the National Academy of Sciences, 100(4), 1484-1489.

Lee, J., Leonard, M., Oliver, T., Ishihara, A., & Jacobson, K. (1994). Traction forces generated by locomoting keratocytes. Journal of Cell Biology, 127(6), 1957-1964.

\* cited by examiner

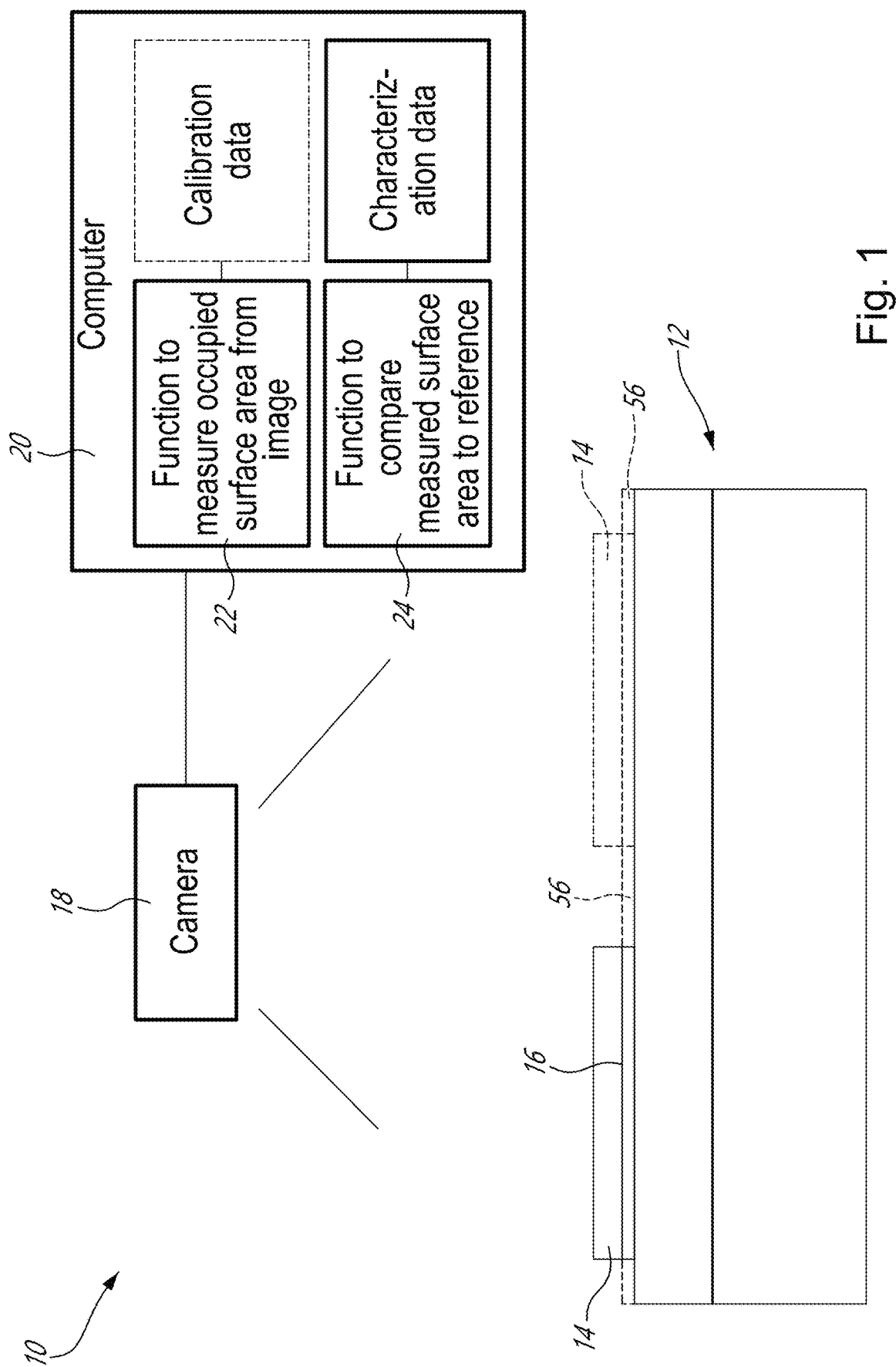

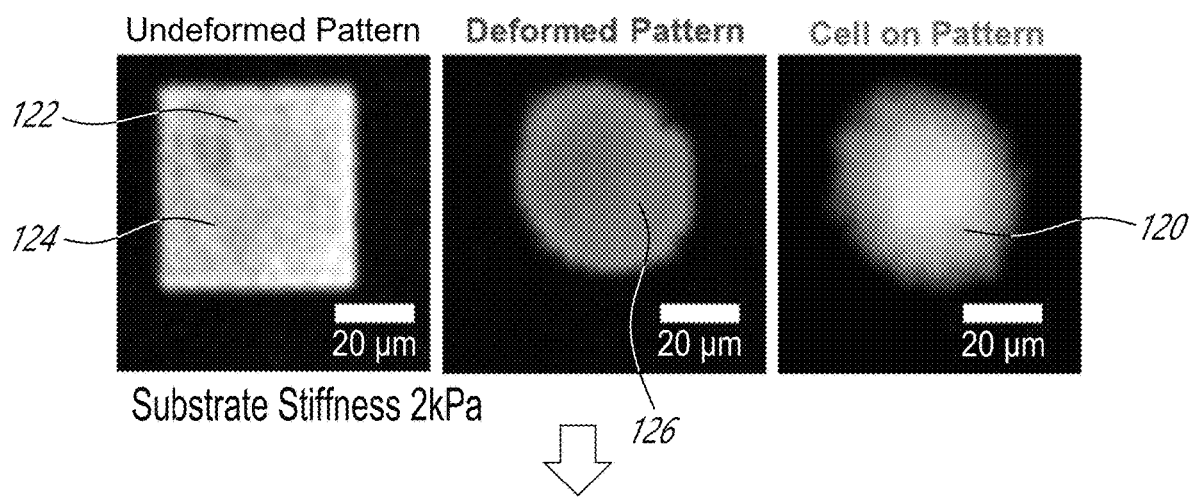
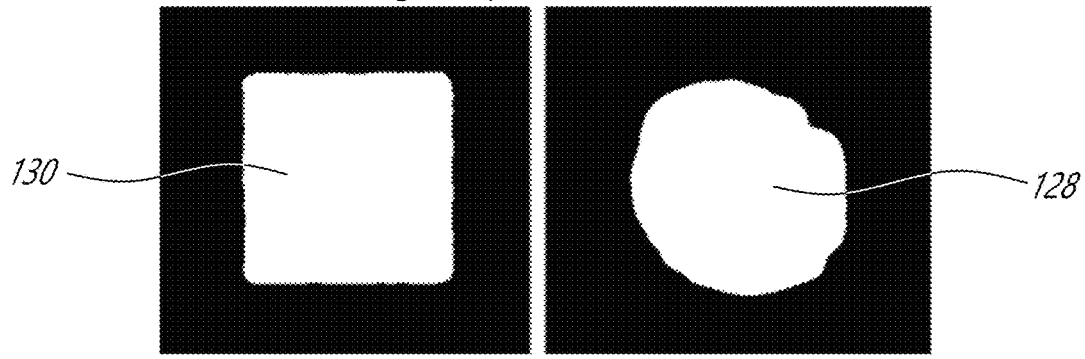
Fig. 7

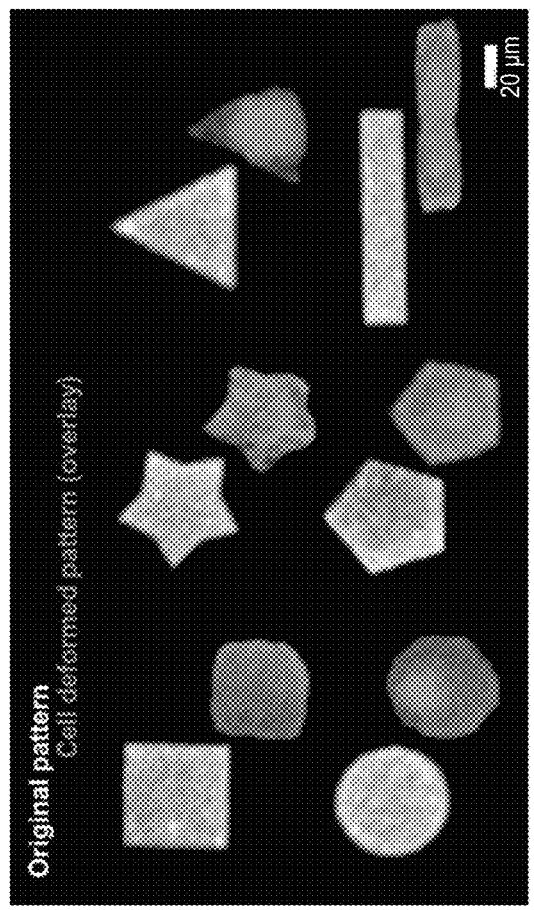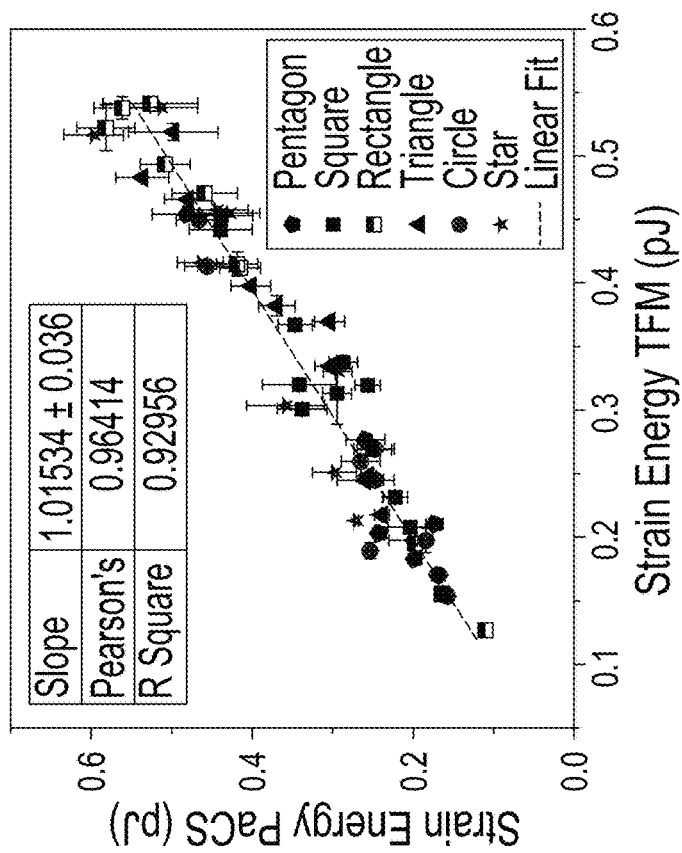
Fig. 8A
Fig. 8B

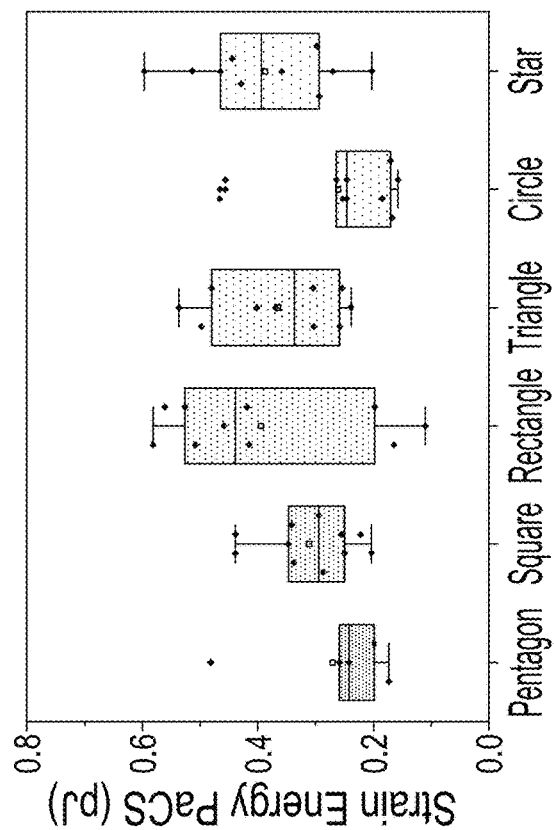
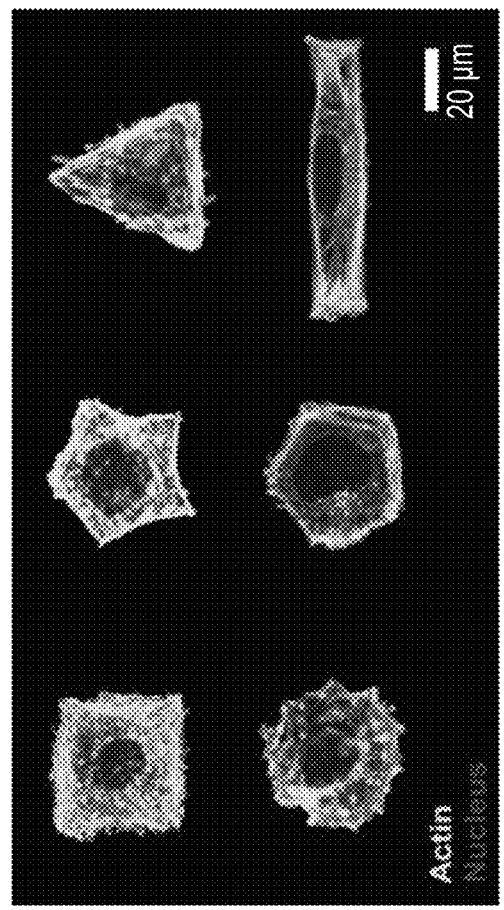
Fig. 8D
Fig. 8C

METHOD AND DEVICE FOR MEASURING CELL CONTRACTILITY

BACKGROUND

Cells are not purely biochemical entities but are also subjected to physical forces and mechanics. Force-generation, sensing, and mechanical adaptation can be seen in nearly every aspect of our physiology. Correct recognition of responses to mechanical cues are key to health, whereas dysfunctional responses can be symptomatic and perhaps causative to numerous pathologies. There is a need to quantify how cells detect and respond to mechanical forces. This is a critical question in biology and biophysics, enabling new approaches in diagnosing and treating diverse aspects of human health.

Cellular forces, whether it be contractile or expansive, are largely generated by molecular motors such as myosin, which pull the filamentous actin network to perform mechanical work on the surrounding matrix. One method which has been used to measure cellular work is referred to as traction force microscopy (TFM). Although TFM was satisfactory to a certain degree, there remained significant room for improvement, in particular due to its experimental complexity. Another approach is molecular, like protein- or DNA-based force sensors. However, development of force sensitive probes and calibration complexities limits, here as well, adaptability to other research labs. Accordingly, there remained a void in cell force measurement methodologies readily implementable without affecting the biological features of the cells, and this void limited the large-scale incorporation of cell biophysics in modern quantitative biology studies.

SUMMARY

There is provided an approach to quantify cell forces based on the characterized resistive forces and deformation of an underlying substrate. More specifically, one or more cells can be adhered, either directly, or via an intermediary adhesive, to an underlying substrate which has characterized mechanical properties (e.g. characterized elasticity or viscoelasticity). The underlying substrate can partially resist deformation by the cell(s) in accordance with a known mechanical relationship. Henceforth, depending on the amplitude of the forces exerted by the cell, the underlying substrate will limit the extent to which the occupied surface area of the cell will deform. The relationship between the deformation and the forces can be known from characterization that, in some embodiments, may be suitably approximated to a simple characterization of the mechanical properties of the substrate itself (such as when any intermediary adhesive has negligible effect on the overall mechanical system). In accordance with this relationship, work can be determined based, for instance, on a difference in surface area occupied by the cell between a first, larger surface area, and a second, smaller surface area. The surface area of the cell can be determined by imaging, either directly (e.g. by directly observing the cell itself), or indirectly, (e.g. by observing an underlying material such as adhesive patch linking the cell or cells to the substrate in situations where it can be assumed or determined that the cell or cells entirely cover the adhesive patch).

The first, larger surface area can be determined from imaging at an earlier time, by imaging an adjacent adhesive patch known to have the same dimension as the one linking the cell or cells but being uncovered by cell or cells, or simply based on known dimensions of the adhesive patch before application of the cell or cells, to name a few examples. However, in some embodiments, it can be desired to provide a system where the first, larger surface area can be specifically and clearly defined as an initial surface area, prior to any deformation effect from the cell or cells. This can be the case, for instance, when it is desired to be able to measure a total amount of work effected by the cell or cells. One way to achieve this is to provide the supporting arrangement in a manner for the cell or cells to be confined to a limited area. In one example, this can be achieved by providing an intermediary adhesive having a limited surface area and which is otherwise adapted to limit the coverage of the cell or cells to its limited surface area. Such an intermediary adhesive can be thin and have negligible mechanical properties, in a manner that its mechanical properties in the overall arrangement are virtually defined by the mechanical properties of the underlying substrate. In other words, it can be configured in a manner to efficiently transfer any and all forces received from the cell or cells into the substrate, in a manner that the mechanical properties of the substrate mainly define the deformation behavior of the intermediary adhesive and cell or cells. In another example, this can be achieved by providing a mechanically characterized/able substrate also having suitable adhesive properties (e.g. an adhesive patch acting as a mechanically characterized substrate as opposed to simply as an intermediary adhesive), and which has a limited surface area and which is otherwise adapted to limit the coverage of the cell or cells.

Other examples are possible. In cases where the initial surface, prior to any deformation effect from the cell or cells, can be known, and the mechanical characterization can be ascertained, an overall value of work can be calculated, with a relatively high degree of precision, on the basis a measurement of a final surface area, a difference between the measured surface area and the initial surface area, and the mechanical characterization. For convenience, the expression "patch" will be used herein to refer the presence of a material which extends to a limited surface area and which is otherwise adapted to limit the coverage of the cell or cells to its limited surface area.

In accordance with one aspect, there is provided a method of measuring cellular forces, the method comprising: acquiring an image of an arrangement having at least one cell covering at least one predictively deformable adhesive patch; measuring, from the image, a surface area of the at least one cell; comparing the measured surface area to a reference surface area; and generating a signal indicative of cellular forces based on said comparison.

In accordance with another aspect, there is provided a device for measuring cell forces, the device comprising: an adhesive surface area configured to receive one or more living cells in adhesion thereto, to restrict spreading of the adhered one or more living cells to the adhesive surface area, and to predictively deform, from an initial surface area value to a deformed surface area value, when subjected to cellular forces generated by the adhered one or more living cells in accordance with characterizable mechanical properties, a non-adhesive surface area immediately and entirely surrounding the adhesive surface area, and a support being rigid and supporting the adhesive surface area and the non-adhesive surface area.

In accordance with still another aspect, there is provided a computer-implemented method of measuring cellular forces, the method comprising: measuring, from a digital image, a surface area occupied by at least one cell on a substrate; calculating a difference between the measured surface area and a reference surface area; calculating, based on the difference, and further based on characterization data representing a mechanical characterization of the substrate, a value of work performed by the cell; and generating a signal indicative of said value of work.

It will be understood that the expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM), to name a few examples.

A computer can have one or more input/output (I/O) interfaces to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. A computer can have components which are local, distributed and/or virtual.

Many further features and combinations thereof concerning the present improvements will appear to those skilled in the art following a reading of the instant disclosure.

DESCRIPTION OF THE FIGURES

In the figures,

FIG. 1 is a schematic view of an example system for measuring cellular forces;

FIG. 7 presents images obtained from the process of FIG. 6;

FIG. 8 presents experiments made with different adhesive surface shapes;

FIG. 100 shows a graphical representation of the stresses provided by the cells shown in FIG. 10A via the TFM beads shown in FIG. 10B.

DETAILED DESCRIPTION

Figure 2A:
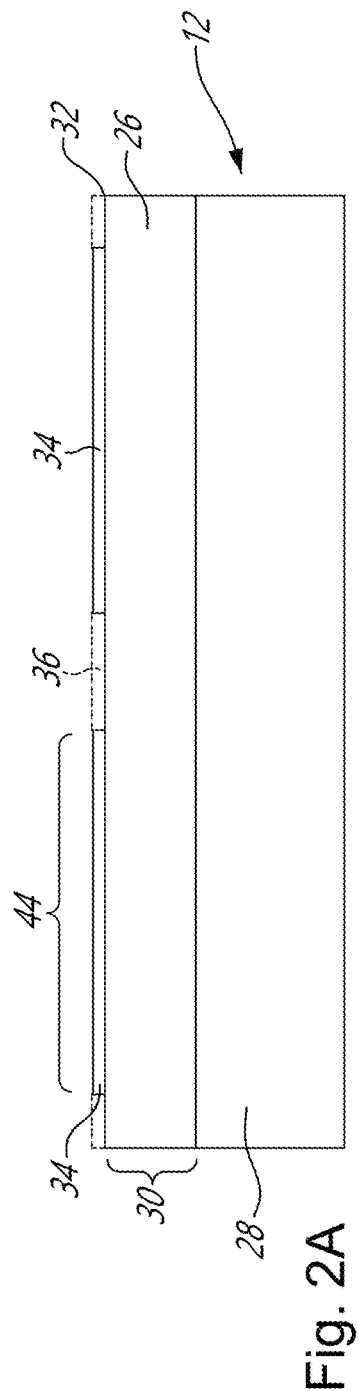
FIG. 2A is a schematic view of an example device for measuring cellular forces, with FIGS. 2B and 2C representing variants of FIG. 2A.

FIG. 1 shows a system 10 for measuring cellular forces. The system 10 includes a device 12 which is configured support one or more cells 14 in a manner for the occupied surface area 16 of the one or more cells 14 to change when exerting cellular forces, whether they are contractile or expansive, in a predictable manner, and to allow imaging of the one or more cells 14. A camera 18 can be used to acquire an image of at least a portion of the device 12 and one or more cells 14, and a computer 20 can be used to measure the occupied surface area from the image 22. The computer 20 can have additional functions such as comparing the measured surface area to a reference surface area 24, and even possibly to calculate work made by the cell based on such a comparison. More about this will be explored further below.

While many cells contract, some, notably including neurons, push (or expand) as part of migrating through their environment. The coverage-based technique, also referred to as PaCS and described in detail below, may be applied in virtually identical ways for contractile cells as for expanding cells, whereby the patterned reference area increases in size when subject to the expansive cellular forces, in contrast to decreasing in size when subject to contractile cellular forces. In both cases, and as will be described below, cell work can be calculated through the change in surface area, whether decreasing or increasing.

FIG. 2A presents the device 12 alone, in greater detail. The device 12 includes a substrate 26 which has predictively deformable mechanical properties in a regime of cellular forces. By "predictively deformable", what is meant is that its mechanical properties can be relatively precisely characterized in a manner to establish a relationship between its deformation and forces which have caused the deformation, and more specifically in a manner to be able to determine the forces, or the resulting work, based on a measurement of the deformation. The substrate 26 can be continuous or discontinuous, and it was found more practical for the substrate 26 to be continuous in this example. For practical purposes, the substrate 26 can, itself, be provided on a rigid support 28. A glass slide, for instance, can constitute a suitable rigid support 28 for many imaging applications, but many other types of rigid supports can be considered suitable depending on the embodiment. In one example embodiment, to simplify the characterisation of the mechanical properties of the substrate 26, it was found suitable to select a thickness of the substrate 30 which is thick enough for any remaining mechanical interaction between the exposed surface 32 of the substrate 26 and the support 28 to be considered negligible. One or more discrete adhesive patches 34 are provided on the exposed surface 32 of the substrate 26. The adhesive patches 34 are spaced apart from one another. A non-adhesive filler 36 can optionally be used there between. The adhesive patch 34 can be made of a material which can be selected in a manner to promote adherence to one or more cells 14 on a adhesive surface area 44, and selected in a manner such that the adhesive patch 34 is thin enough so as to transfer any forces exerted by the one or more cells 14 directly to the substrate 26, in a manner to lead the substrate 26 to deform based on the forces exerted by the cell or cells 14 and on the characterized mechanical properties with as much fidelity as possible. The rigidity of the support 28 can be selected in a manner to allow practicality in terms of handling the devices 12 before and during use, for example.

Figure 2B:
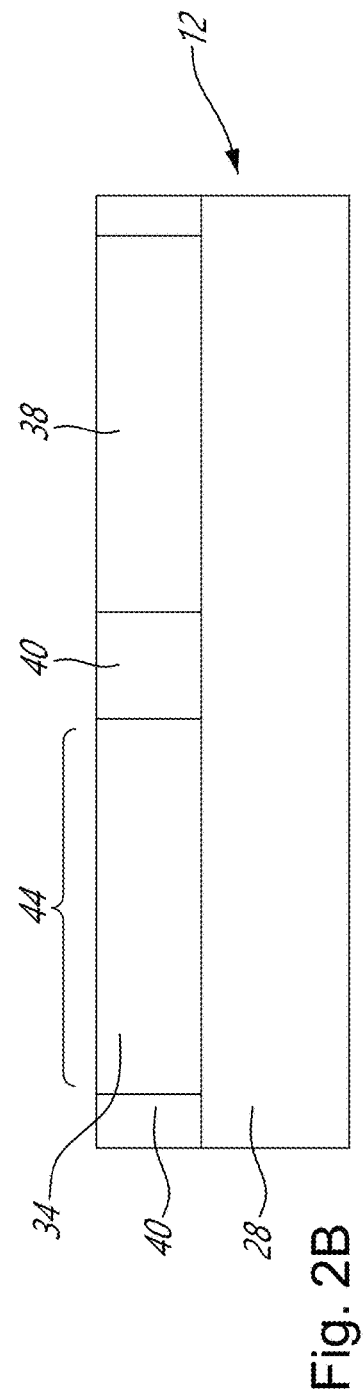
Figure 2C:
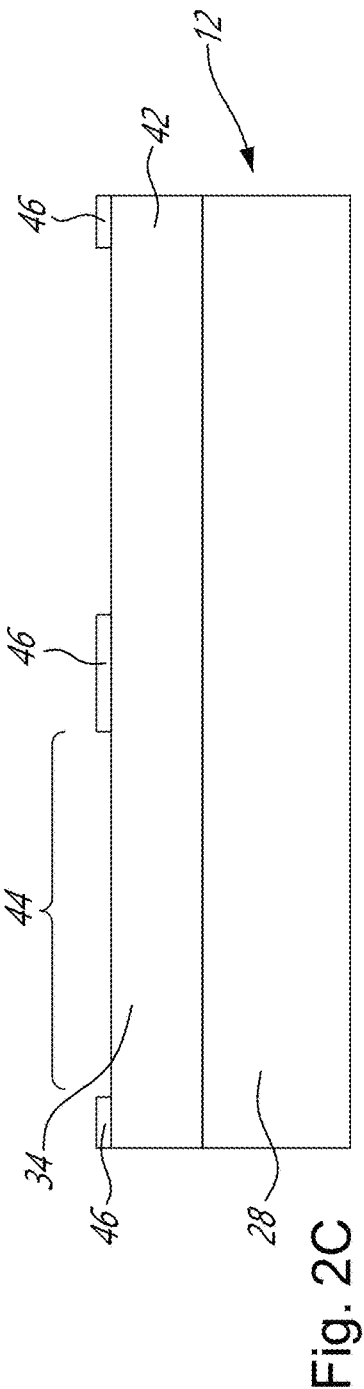

FIG. 2B presents one example alternative in which one or more patches are provided on a rigid support 28, and where the material of the patch 34, and its dimensions, is selected in a manner to be both predictively deformable and adhesive, thereby omitting the need to have an additional layer in the form of an intermediary substrate. The area around the patch or patches 34 can be filled with non-adhesive material 40 (which can otherwise have mechanical properties similar to the mechanical properties of the adhesive patch 34, if desired), while the patch or patches provide one or more adhesive surface areas 44. Many other variations are possible. For instance, FIG. 2C presents yet another possible variation where a continuous substrate 42 of a material which is both adhesive and predictively deformable, and one or more exposed adhesive surface areas 44 are delimited by an anti-adhesive layer 46 which prevents the cell or cells 14 from extending outside of, or exerting any forces outside of the adhesive surface area 44.

The adhesive surface area 44 can be selected in a manner for a unique cell 14 of a known type, or for a group of cells 14, to entirely cover that surface area 44 with a high degree of fidelity, and accordingly, the surface area of the cell 14 can be considered to equate the adhesive surface area 44 of the adhesive patch 34. It will be seen that such configurations can be useful, for instance, in intentionally defining an initial surface area, prior to any cellular-induced deformation, which can serve as a reference in functionalities such as defining a total amount of work. A quick side note will be made here, to which we will come back later, to indicate that other configurations are possible, such as having a single cell 14 spanning more than one adhesive patch 34, but we will continue on with this first example in the meantime.

As presented above, an objective of acquiring the image can be to enable the measurement of the surface area occupied by the cell 14, in a manner to then be able to draw a link between deformation of the cell 14, which is, in this example, strongly affected by the resistance to deformation of the material extending below the adhesive surface area 44, and by the forces provided by the cell 14. Many different suitable imaging techniques can lead to this end.

For instance, the surface area occupied by the cell 14 can be acquired positively, by a representation of the cell itself in the image or negatively, by a representation of the area surrounding the cell 14 in the image. When it can safely be assumed that the cell 14 entirely covers the adhesive patch 34, a representation of the adhesive patch 34 in the image can be considered a representation of the cell 14 itself in the image. Intensity or contrast-based techniques can be used, either directly, from the side of the arrangement where the cell or cells 14 is/are exposed as is perhaps best seen in FIG. 1, or from the opposite side, such as through a glass slide acting as a support, for instance. An example of an intensity-based technique can include an adhesive patch 34 which is fluorescent, the fluorescence of which can be captured in the image in the form of light. Another example can be a scenario where the cell 14 itself is provided with a fluorescent label. An example of a contrast-based technique can consist of intently making the adhesive patch 34 and/or the cell(s) 14, or the surrounding area 36, 40, 46, more opaque or reflective than the other, such that light transmission across the arrangement, or light reflection by the arrangement, is affected differently in the cell area than in the surrounding area, in a manner to be discerned in the image. The bandwidth of wavelengths of electromagnetic radiation in which features are considered "bright" or "opaque", and the corresponding sensitivity of the imaging system, can vary from one embodiment to another, and can extend inside, or outside the visible spectrum depending on the embodiment.

Depending on the specifics of the embodiment, the material selected to form the adhesive surface area 44 can vary. Some materials are relatively multifunctional, while not being particularly adapted to any type of cell 14 in particular. This can bee the case of polylysine, for instance. However, different cells 14 may tend to adhere more or less to different compounds, and in some embodiments, to promote a strong adhesion and an efficient transfer of forces from the cells 14 to the substrate, it can be preferred to select the material of the adhesive patch 34 as a function of the type of cell with which it is intended to be used. Types of materials can possibly include two significant categories: chemical or protein-based, and an additional factor in the choice of the adhesive patch 34 material can be whether the adhesive patch 34 is to be visible in the image or not (i.e. if it is instead the cell or cells which are made visible in the image). Example materials can include collagen, lysine, lectin, laminin, antibodies, peptides, proteins, integrands, electrostatic glues. In some embodiments, it may be even be considered worthwhile to temporarily functionalize the adhesive patch 34 in a manner to make it temporarily more adhesive to a specific type of cell 14, such as by adding a specific acid to it or treating it with plasma. Imposing the condition of predictive deformation behavior in addition to adhesiveness in a same material necessarily limits the amount of suitable options.

The material selected to form the predictively deformable material can also vary from one embodiment to another, and as a function of whether it is desired for this material to also have adhesive properties or not in a given embodiment. In some embodiments, it can be preferred to favor a material which is elastic within the expected cellular force regime, as this can simplify the characterization of the material from the point of view of reconstituting the forces or work from a visualisation of deformation. Silicones, and more specifically very soft silicones, can be materials of choice for some embodiments. Silicones can be virtually purely elastic, inert, and have mechanical properties which are essentially unaffected by changes which can be expected in the environment from one lab to another. In some embodiments, viscoelastic materials can be considered sufficiently predictively deformable to be suitable. Hydrogels, for instance, can be suitable in some embodiments, but may pose certain challenges which silicones may help avoid, such as changes in mechanical properties based on swelling or shrinking stemming from osmolarity changes. In some cases, such challenges may be overcome by using hydrogels in relatively controlled environments, for instance, or by calibrating the mechanical characterization of the hydrogel using sensors to sense one or more variables of the environment which can be expected to predictively affect the mechanical characterization. For instance, if the mechanical properties of a hydrogel are known to vary in a known way as a function of humidity from calibration, using a humidity sensor at the time of use may allow to select the right mechanical characterization table and thus overcome this hurdle. Some materials, such as hydrogel, may also involve challenges associated to handling, and it can be required to refrigerate them or the like, which may make then less suitable to some embodiments.

Figure 3:
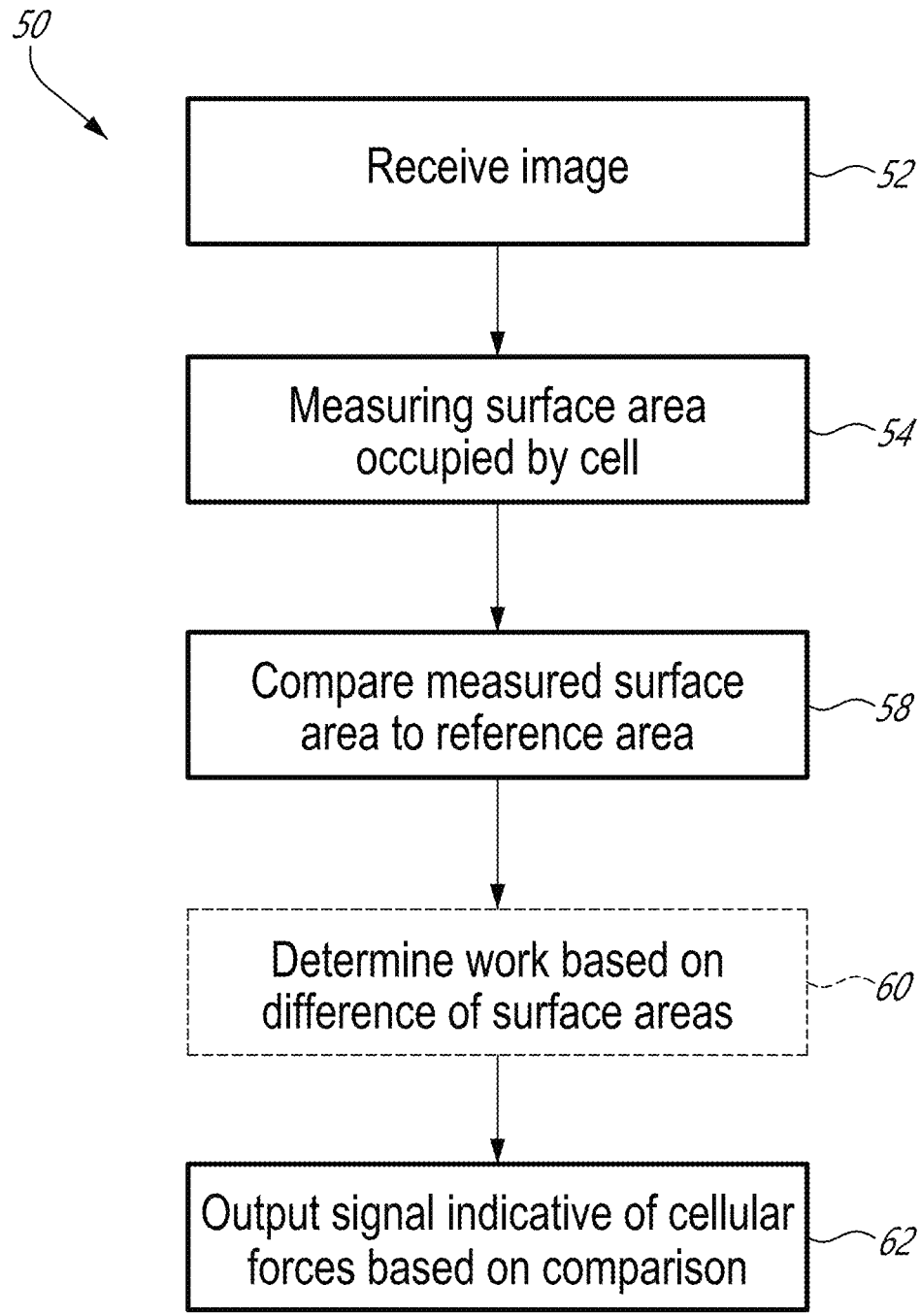
FIG. 3 is a flowchart representing an example method for measuring cellular forces.

Once acquired, the digital image can be processed by a computer in a manner to make a determination about cellular forces. FIG. 3 is a flowchart illustrating an example computer-implemented method 50 to make a determination about the cellular forces. Subsequently to receiving the image 52, the area occupied by the cell 14 is measured in the image 54. This is achieved by using a function which can dissociate the "cell area" from the "surrounding area" in the image, and which can depend on the imaging technique used. For instance, in an embodiment where the adhesive patch 34 is fluorescent and appears brighter than the surrounding area, and where the cell or cells 14 are assumed to entirely cover the adhesive patch 34, the algorithm can simply set a brightness threshold above which a pixel is considered to correspond to the cell area, and/or below which a pixel is considered to correspond to a surrounding area (in some cases, if only one of the two is actively determined, the other one can be assumed to be the other). In an example obscuring-type technique, the classification can be inversed for instance, and brightness below the threshold can be associated to the cell area. In some embodiments, a "marker" configured to be "seen" in the image can be integrated to the adhesive patch 34, or directly to the cell 14, whereas in other embodiments, the "marker" can be integrated to a material surrounding the adhesive patches 34, for instance, such as in a filler material 56 shown in dashed lines in FIG. 1. More elaborated techniques can be used as per the designer's preference in view of specific embodiments. The number of pixels associated to the cell area can then be summed to provide a value proportional to the surface area occupied by the cell 14, and this value can optionally be converted into other units using calibration data, which can map a number of pixels to an absolute value of surface area in units such as square microns or the like, to give an example.

The value of the measured surface area is then compared to a reference surface area value 58 to make the measurement of the cellular forces. The source of the reference surface area can vary from one embodiment to another, and some examples will be provided here for clarity. In a first example, the measured value can be provided in absolute units such as square microns, and the reference surface area value can be provided in the same units, and can simply be inputted into the computer in the form of reference data. For instance, if, due to the manufacturing technique or a subsequent inspection technique, it is known that adhesive patch 34 has a given value of surface area 44 in microns before receiving the cell, that given value can be entered into the computer as reference data, and used as the reference area, and the comparison can be made to determine by how much the cell 14 has contracted (or expanded) the substrate, and hence the adhesive patch 34, from the initial surface area. Such a comparison, and more specifically a subtraction of the measured surface area from the reference surface area, can form the basis of a subsequent measurement of work, which can have particular use and which will be explored further below.

In a second example, the measured value and the reference value can both be provided in the same relative units, such as a number of pixels, and can simply be two measured values acquired using the same technique and setup. For instance, the reference value can be a value measured at a first time, such as immediately after adhering the cell or cells 14 to the adhesive patch or patches 34, before the cell 14 has had time to begin contracting (or expanding) the substrate, and the measured value can be a value measured at a second time, after the first time, once the cell or cells 14 have had time to contract (or expand) the substrate. It will be understood that using such a technique, one may wish to make a comparison based on an initial stage and a final stage, as suggested in this example, but one may alternately wish to make a comparison between other stages, or even regularly monitoring the forces over a given period of time, for example.

In a third example, the measured value and the reference value can both be provided in the same absolute or relative units, and can be based on two measured values taken at the same time. For instance, the substrate can be provided with more than one patch 34, and perhaps one of the patches 34 can still be configured in a manner to be discernable in the image, such as being fluorescent for instance, while not being adhesive, and therefore left bare after the cell application step and during imaging. The two patches 34 can be manufactured in a manner to have the same surface area 44, for instance, in a manner that the comparison can be based on the adhesive patch 34 known to bear the cell or cells 14 and to deform the substrate, and the patch 34 which is left bare and which is known to remain in its original surface area. Many other examples are possible and attempting to enumerate them all would be outside the scope of this specification.

As exposed above, one interesting functionality which can be implemented with a system and process such as presented above can be to ascertain an amount of work accomplished by the cellular forces 60. For instance, if we measure the surface area once the work has been done, and compare it to the initial surface area, we can calculate the strain energy applied by the cell 14 to achieve the deformation. Indeed, the strain energy be calculated by integrating the product of displacement and traction vectors over the area, using the equation, $$U = \tfrac{1}{2} \int f \cdot u \, dA$$

where U, A, f and u are strain energy, area, traction stress and displacement respectively. Moreover, the noise of the measurement can be ascertained by calculating cellular forces from undeformed areas.

The approach presented above is perhaps quite precise, but may be somewhat cumbersome to implement in a practical embodiment. In embodiments where additional simplicity is required and where the predictively deformable material is linearly elastic across the force regime, a simplified work equation based on unidirectional tension/compression may provide suitable precision with significantly greater simplicity, such as $$U = \tfrac{1}{2} \in \cdot \sigma \cdot V$$

where, U, ∈, σ and V are strain energy, strain, stress and volume of the predictively deformable material. With such an equation, thickness (t) can be used as a fitting parameter that yields the best result as opposed to reflecting the geometry of the substrate, based on calibration using another, more elaborate technique.

Ultimately, an output signal indicative of the cell 14 forces based on the comparison 58 is generated.

Figure 4B:
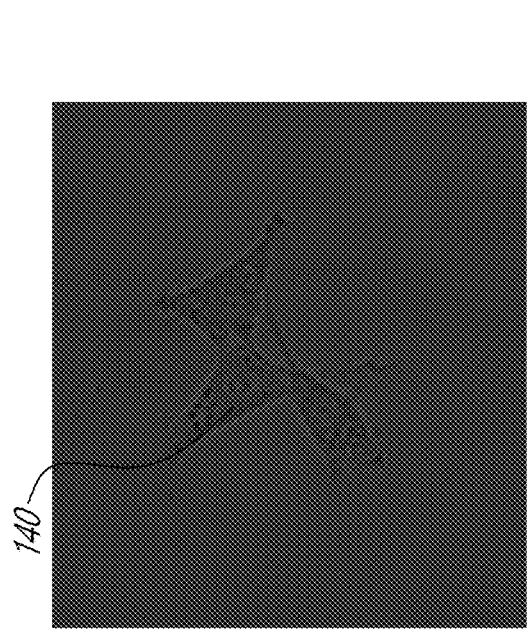
FIGS. 4A-4C presents images formed in an alternate example system for measuring cellular forces, where the cell overlaps a plurality of patches.
Figure 4C:
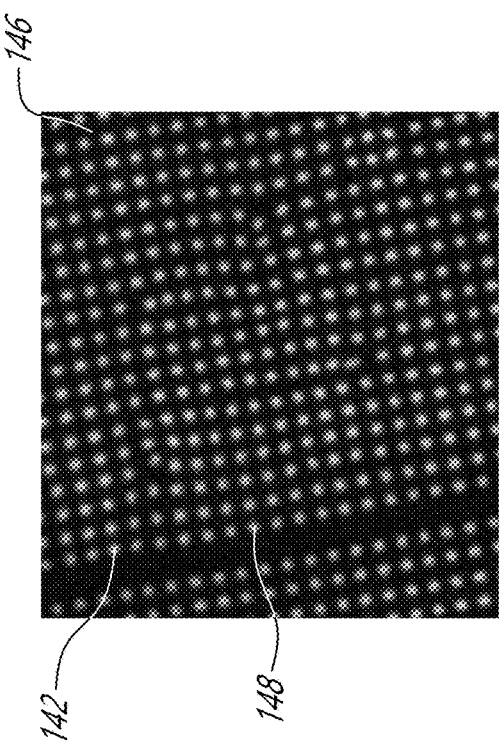
Figure 4A:
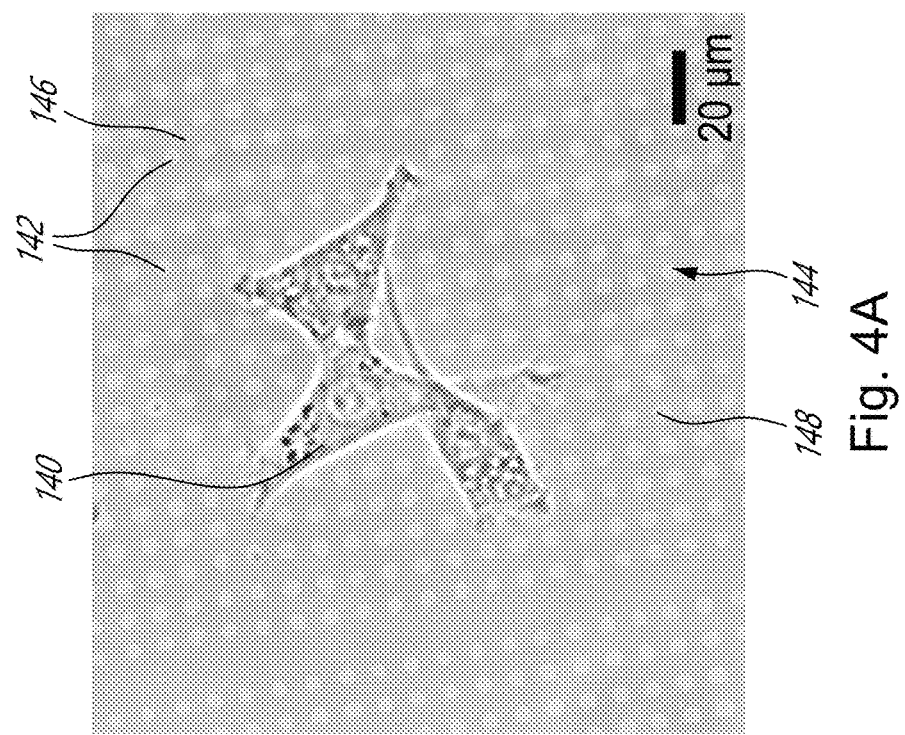

Attention is now brought to FIG. 4A, showing an image having been formed in an alternate embodiment of the system. In this example, the adhesive patches 142 are much smaller than the cell 140, forming a bed of patches 144 on which the cell 140. The bed of patches 144 can be an array of patches, for instance. For simplicity's sake, only one cell 144 is being shown in FIG. 4A-4C, however it is understood that a plurality of cells 144 extending over a plurality of adhesive patches 142 can be received on a single device without departing from the present disclosure.

When received on the device, the cell 140 extends over a plurality of the adhesive patches 142 and over the non-adhesive filler 146 surrounding/between the patches 142. In this example the patches 142 are covered with a fluorescent agent, as is perhaps best seen in FIG. 4C, permitting to easily delimit their surface in comparison to the surrounding filler 146. In an example process, a digital image is acquired and processed by a computer in a manner to make a determination about the cellular forces. In this example, the extracted forces information of the different patches 142 are associated to the forces of one cell 140. For instance, displacements of individual ones of the adhesive patches 142 can be measured, in addition to or instead of deformation, expansion or contraction, and a measurement of cellular forces can be achieved based on the individual displacements of the patches 142. Alternately, the change in overall surface area encompassed by the adhesive patches 142 which have been determined to have been displaced can form a basis of a measurement of the cellular forces. It is understood that such a device can further be used to extract motor information of the cell 140 when it interacts with other cells, or other elements in its environment without departing from the present disclosure.

Still referring to FIGS. 4A-4C, in this particular embodiment, the cell 140 is a 3T3 fibroblast cell which is confined on a bed 144 of patches 142 made of fluorescent BSA-fibronectin printed on a 2 kPa silicone substrate. In this example, the patches have a circular dot diameter of 4 um with a spacing of 4 μm between each patch. The image of the cell is perhaps best seen in FIG. 4B, while the changes in the surface area of the different patches in contact with the cell 140 (combination of cell 140 and patches best seen in FIG. 4A) is perhaps best seen in FIG. 4C. It is understood that other types of cells, patch materials or sizes, fluorescent markers and substrates can be used without departing from the present disclosure.

Figure 5A:
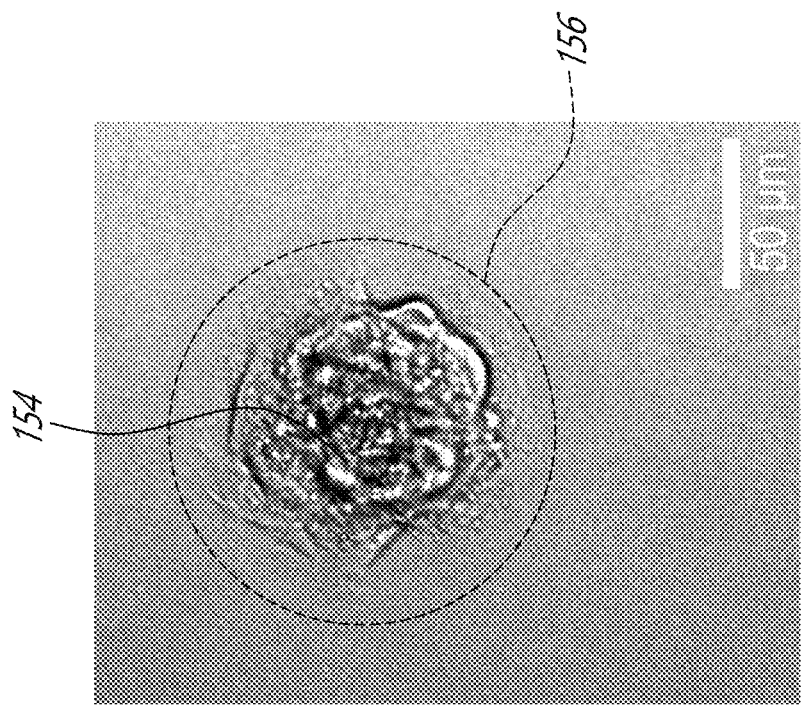
FIGS. 5A-5B presents images taken in yet another alternate example system for measuring cellular forces, where a plurality of cells are adhered to a single patch.
Figure 5B:
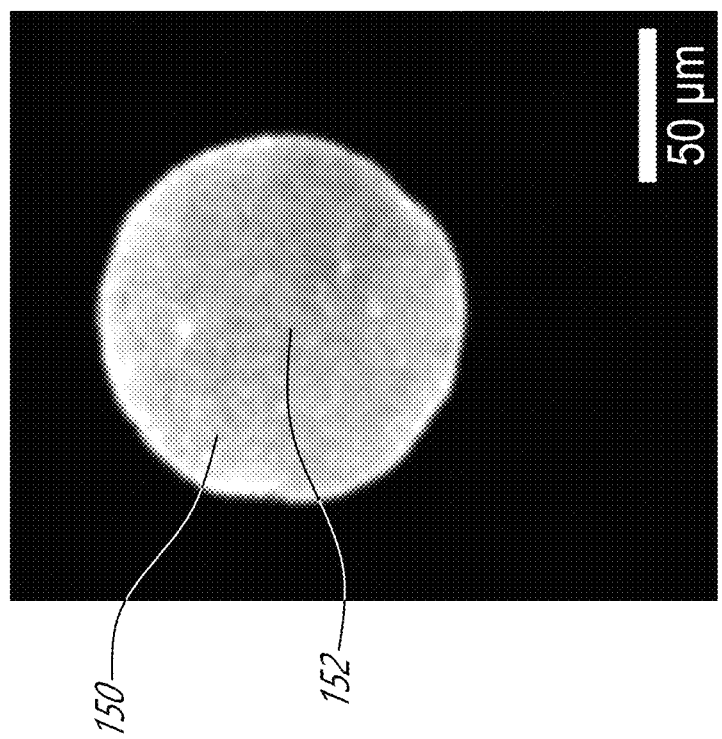

Attention is now brought to FIGS. 5A and 5B showing images taken in another embodiment of the system for measuring cellular forces. In this example, the patch 150 of the device has an adhesive surface area 152 which is considerably larger than the cells 154 intended to be observed. The cells are perhaps best seen in FIG. 5B, where the perimeter of the patch 150 is shown via a dashed circle 156. In this scenario, the plurality of cells 154 can be confined on a single patch 150 and the contractility (or expansion) observed through the determination steps explained above would be the result of the combination of cells 154 on the patch 150.

In this particular example, the cells 154 are a plurality of 3T3 fibroblast cells, which as confined on a patch 150 circle of 100 μm in diameter made of fluorescent BSA-fibronectin printed on a 2 kPa silicone substrate. It is understood that other types of cells, patch materials or sizes, fluorescent markers and substrates can be used without departing from the present disclosure. For instance, in an alternate embodiment, the patch 150 can have a diameter over 200 μm.

Figure 10B:
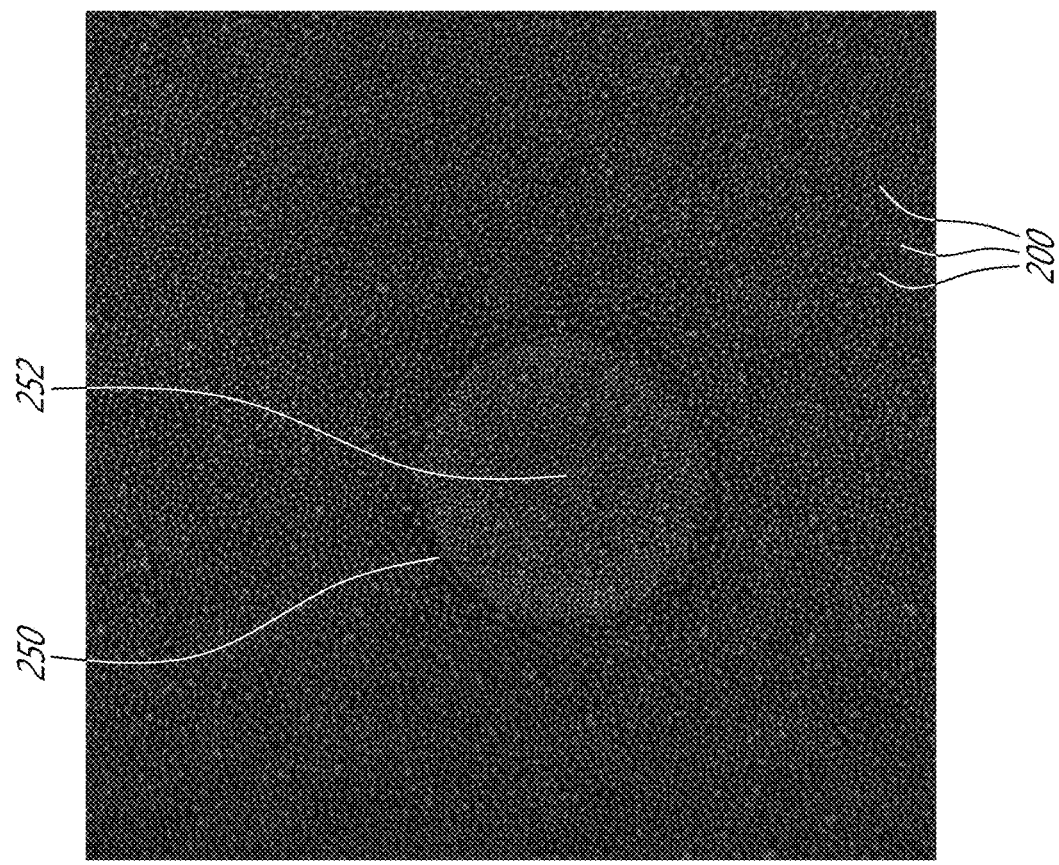
FIGS. 10A and 10B present images of another embodiment where a plurality of cells are adhered to a single patch, the surface further having TFM beads for comparison of measurement systems.
Figure 10A:
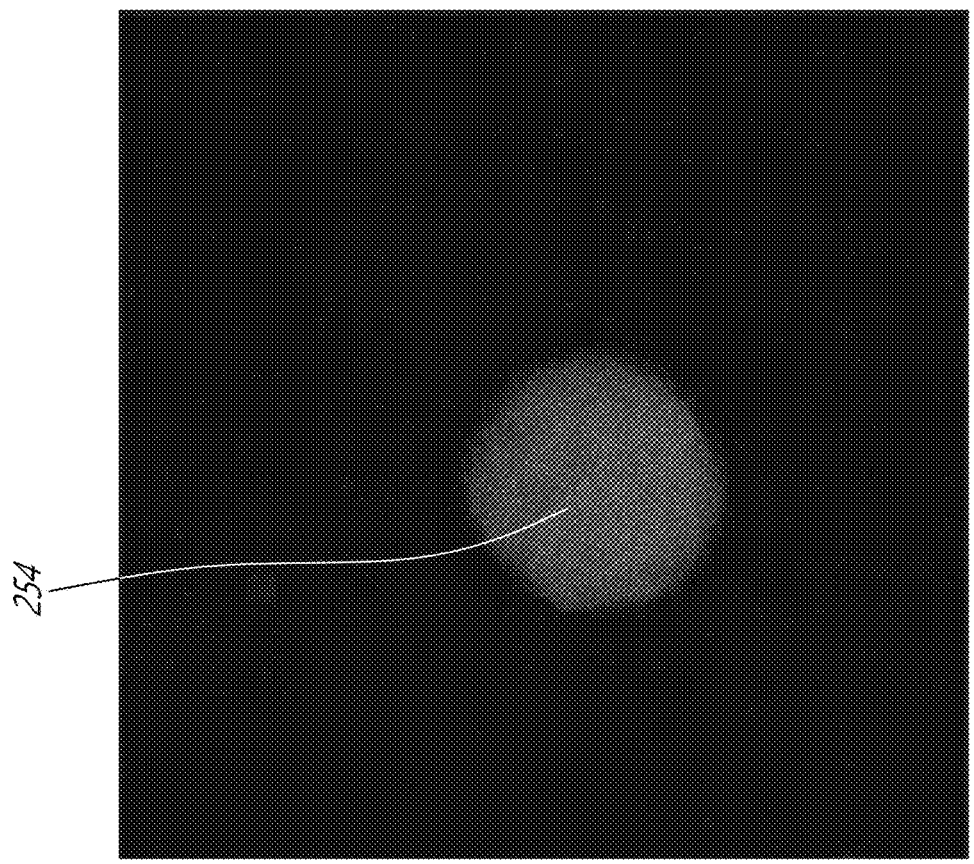

Attention is brought to FIGS. 10A and 10B, which show images of another embodiment where a plurality of cells 254 are provided on a surface having a single patch 250, while the device is further provided with TFM beads 200, also known as bead markers. FIG. 10A shows the TFM bead 200 distribution on the test surface, which further includes a single patch 250 forming a circular micropattern having a 15 000 μm² surface area. The distribution of TFM beads 200 is generally shown as homogenous and covering the surface of the patch, such that the bead-displacement TFM measurements can me extracted simultaneous to the measurements from the coverage-based technique described herein. FIG. 10A shows the cluster of cells 254 provided on the circular patch 250 and on top of the TFM beads 200. In this particular embodiment the cells 254 are NIH-3T3 fibroblasts, however it is understood that the coverage-based technique of the present application is not limited to the use of these exact types of cells. While the delimitation of the patch 250 is not visible in FIG. 10A, it can be seen that the cells 254 are provided on the patch 250, as correspondingly shown in FIG. 10B, and provided on the adhesive surface 252 of the patch 250.

Figures 10C, 10D:
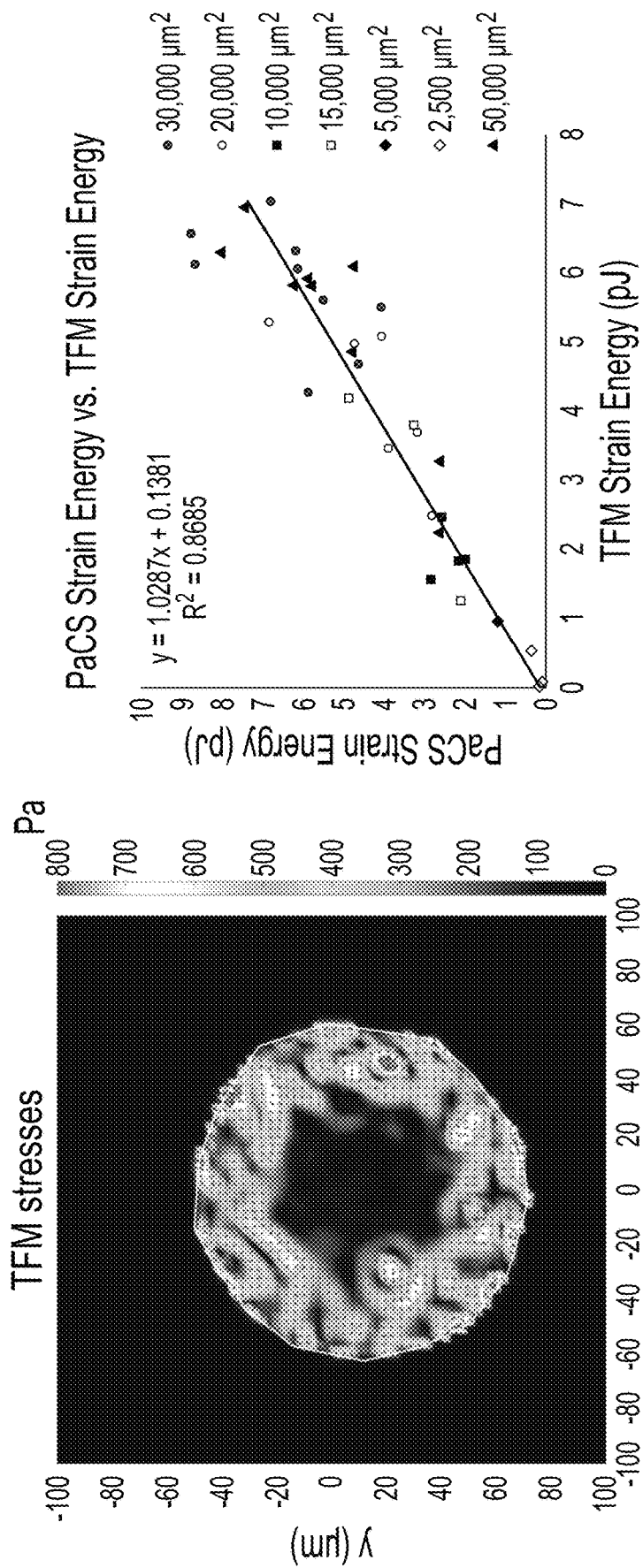
FIG. 10D shows a graph of experimentally measured stressed provided by cells using coverage-based technique in comparison to the TFM method, for differing patch sizes.

Attention is now brought to FIG. 10C, showing a graphical representation of the stresses provided by the cells 254 shown in FIG. 10A via the TFM beads shown in FIG. 10B. More specifically, FIG. 10C shows the stresses provided by the 3T3 fibroblast cells on the circular patch 250, which explains why the stress pattern can be seen as generally circular.

The stress information provided by the TFM can be compared with that calculated by the coverage-based technique described in detail in the present application. The agreement between these two measurement methods are provided in FIG. 10D, showing a graph of experimentally measured stressed provided by cells using the coverage-based technique in comparison to the TFM method, for differing patch sizes. As the x-axis and the y-axis of this graph represent corresponding information for the different methods—that is, the x-axis represents the strain energy measured through TFM techniques, while the y-axis represents that same strain energy, but measured through a patch such as the one shown in FIG. 10A-10B (ie. the coverage-based technique (PaCS) described herein), it is expected for the results to follow a linear plot. As can be seen, there is an agreement between the measured strain energy recorded with each technique across the different patch sizes, resulting an a coefficient of determination $R^2=0.8685$.

Proof of Concept

One example embodiment will now be presented with a deep emphasis on details in a view of providing a proof of concept and a fully detailed example embodiment.

Adhesive protein micropatterns can be printed on the surface of compliant silicone substrates. Such a substrate is polydimethylsiloxane (PDMS) because of its favorable material properties such as the ability to tune its stiffness over a large physiological range, chemical stability (nondegradable) and bioinertness. PDMS is also optically transparent (refractive index ~1.4) and amenable to spin coating. This facilitates creating a uniform and flat surface that avoids the confounding effects of hydrogel porosity on the cells.

Flat PDMS substrates are cured with a specific Young's moduli ($E=2\pm0.06$, $12\pm0.71$ and $23\pm1.86$ kPa) on cover glass. Next, adhesive protein micropatterns of desired shapes and sizes are printed on PDMS substrates using a PRIMO photopatterning system. It will be understood that other photopatterning systems can be used without departing from the present disclosure.

Figure 6:
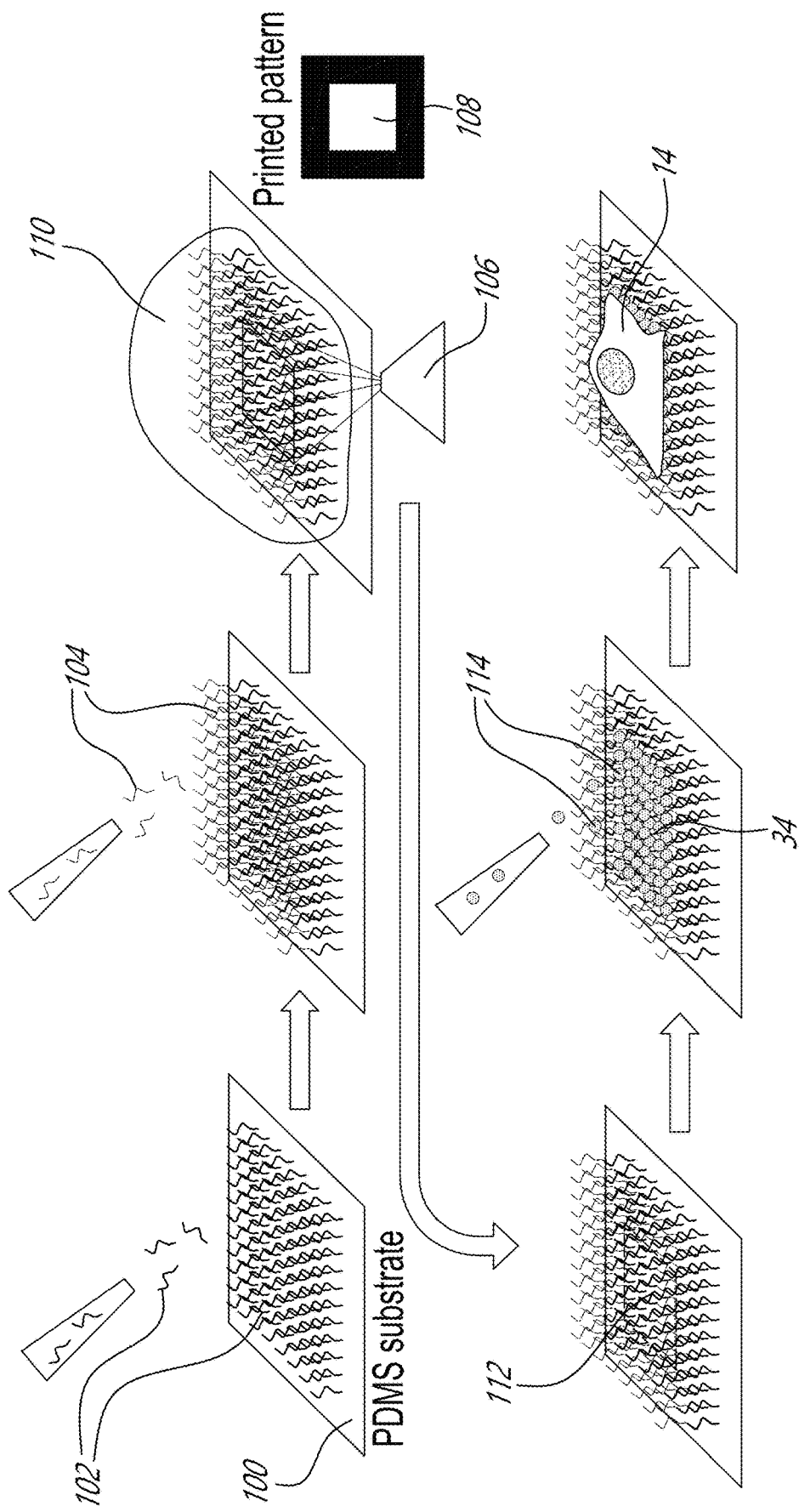
FIG. 6 schematizes an example process of measuring cellular forces.

Referring to FIG. 6, PDMS substrates 100 were first coated with Poly-1-lysine (PLL) 102 which promotes cell attachment, followed by a coating with an antifouling agent Polyethylene glycol valeric acid (PEG-SVA). A PRIMO photopatterning system 106 utilizing a UV laser was used to project a pattern 108 on the surface of a 2 kPa PDMS substrate 100. The projected UV laser etches PEG-SVA 104 in the presence of a photo initiator PLPP 110, thus exposing the underlying PLL 102 layer 112 for adhesive protein attachment 114 serving as an adhesive patch 34, using a combination of fluorescent bovine serum albumin (BSA) and fibronectin for visualization and cell 14 attachment. The initial surface area of the adhesive patch 34 was of ~2400 $\mu m^2$. In this example, NIH 3T3 fibroblast cells were confined to corresponding ones of the adhesive patches.

Referring to FIG. 7, fibroblast cells 106 deform the soft silicone substrate 122 using forces provided by the cells 106 thus deforming the initial shape 124 or pattern into different shapes 126, and, in this case, reducing its surface area. The figures can be binarized to measure the deformed pattern area 128 and compare it with the initial pattern area 130, which along with material properties of silicone allows us to calculate total work done (strain energy) by the cell to deform the substrate. In this case, the representative fibroblast cell 106 is applying a strain energy of $0.130\pm0.02$ pJ, deforming the square pattern of $2402\pm32$ $\mu m^2$ to a pattern area of $2004\pm44$ $\mu m^2$, on a 2 kPa PDMS substrate.

To determine the accuracy of our work measurement, we compared the measured cell strain energy achieved the technique described above, with cell strain energy measured using bead-based traction-force microscopy (TFM). The PDMS substrates were coated with fluorescent beads, followed with printing of adhesive micropatterns on the substrates. Fluorescent beads allow us to measure work with bead-displacement TFM and compare it with the work calculated from the technique presented above for the same cells. Micropatterns of the same area (~2400 $\mu m2$) but with different shapes (square, circle, triangle, rectangle [Aspect ratio=6], star, and pentagon) were printed, see representation on FIG. 8, image (a), on PDMS substrates with a Young's modulus of 12 kPa and measured cellular forces of NIH 3T3 fibroblast cells with both techniques.

As presented in FIG. 8a-d, fibroblast cells confined on diverse pattern shapes deformed the patterns, the areas of which were used to quantify cellular forces. When compared with bead-based TFM measurements, the coverage-based technique described above (referred to as PaCS in the figure) accurately measured work of fibroblast cells confined on patterns of all investigated different shapes. The increased pattern deformations strongly correlate with higher strain energies applied by the cells to deform the underlying substrate.

Thus, the technique proposed above is considered to allow accurately and precisely measuring cellular forces irrespective of pattern shape with the availability of the cells for post processing, at least in some embodiments.

To demonstrate the ability of this technique to allow post-processing, the confined cells were fixed and stained with phalloidin and DAPI to visualize the actin filaments and nucleus, respectively, as best seen in FIG. 8c. These fluorescent images reveal that actin filaments are most concentrated on external polygon edges and terminate at polygon vertices. Conversely, circular shapes appear to promote radially aligned actin filaments in the cell, which results in cell applying lower strain energies when compared with other cell shapes. These data show how profoundly cell geometry impacts cytoskeletal structure.

Figure 9B:
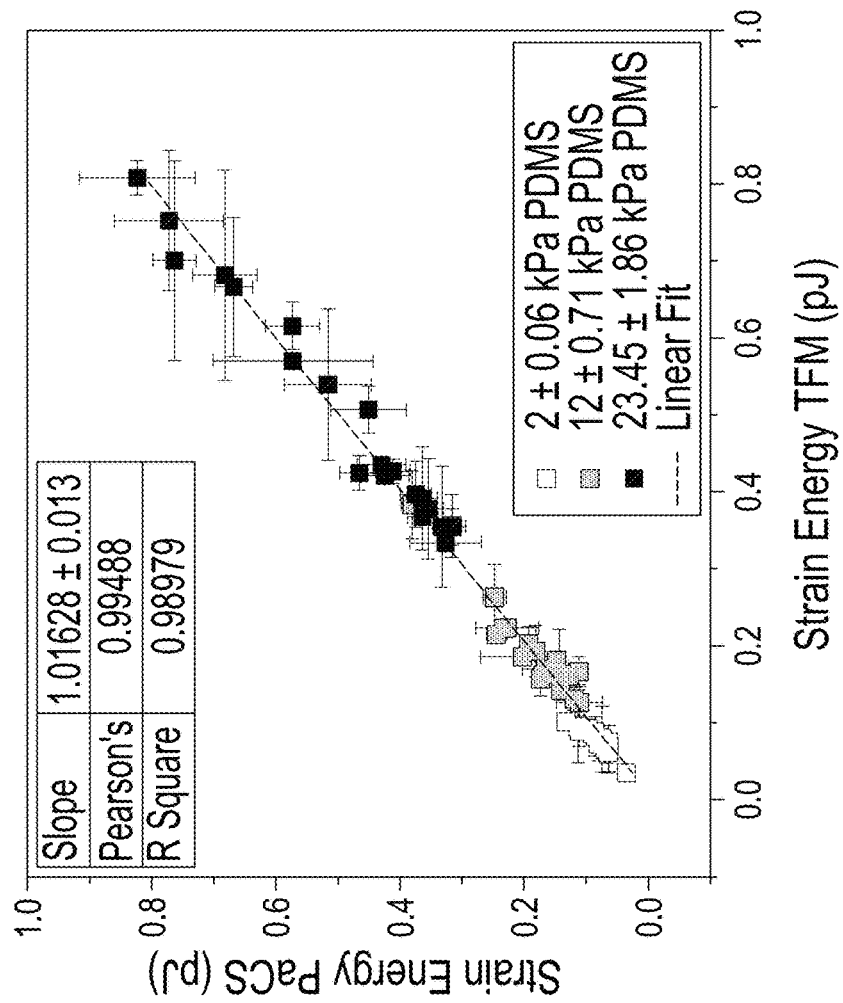
FIG. 9 represents additional experiments made with a process such as presented in FIG. 6.
Figure 9A:
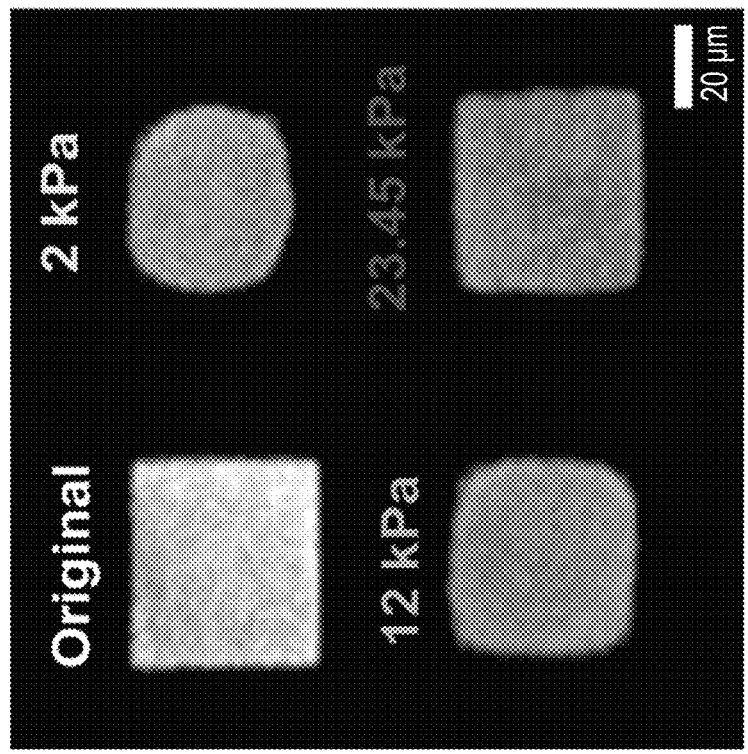
Figures 9C, 9D:
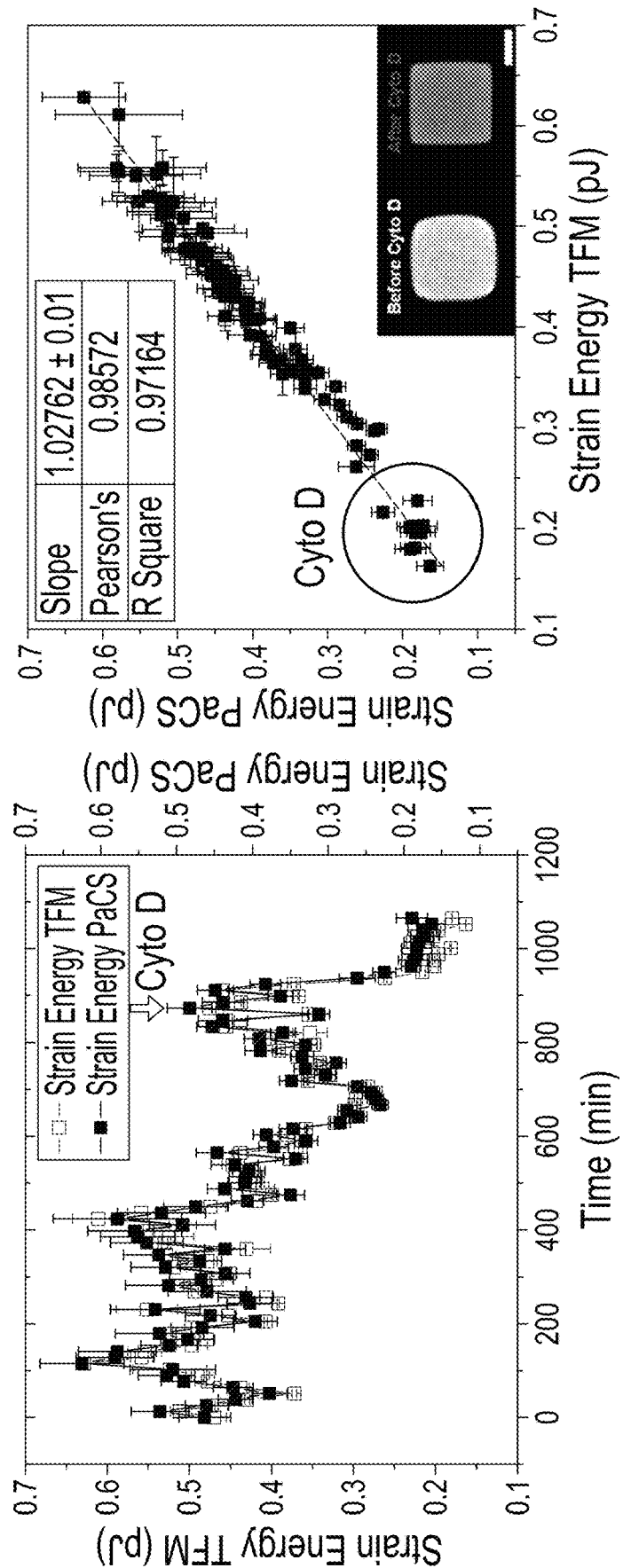

To examine the accuracy of the coverage-based technique on different moduli substrates, coverage-based measurements with bead-based TFM using PDMS substrates coated with fluorescent beads were compared. The work of 3T3 fibroblast cells on square patterns of the same area (~2400 $\mu m^2$) printed on PDMS substrates with Young's moduli of 2, 12 and 23 kPa were measured, see FIG. 9. A decreased pattern deformation with increasing substrate stiffness was observed, while cells applied more work on stiffer substrates. The work measurements from the coverage-based technique are highly correlated with the work calculated with TFM. Thus, the coverage based technique can accurately and precisely resolve cellular force differences on different stiffness PDMS substrates at least in some embodiments.

The ability of the coverage-based technique to resolve time-dependent work was further tested. Fibroblast cellular forces on square patterns (~2400 $\mu m^2$) on PDMS substrates (12 kPa) for 18 hours were measured; to further test the sensitivity of this technique the cellular forces was inhibited by depolymerizing actin using Cytochalasin D (Cyto D) in the last few hours of measurement. Using time-dependent coverage-based technique, cellular forces with time was measured when compared to TFM measurements, even after the Cyto D treatment, as presented in FIGS. 9c and 9d. The increased pattern area after drug treatment indicates decreased cellular force with time. Also the low strain energy values of ~0.1 pJ indicate minimum resolution of the measurement on 12 kPa PDMS substrate. Accordingly, at least in some embodiments, the coverage based technique can accurately and precisely measure time-dependent cellular forces as a function of substrate stiffness, without the need for a null force image, thereby enabling higher number of measurements per experiment, with the availability of the cells for post-processing such as immunofluorescence.

Synthesis of Compliant Silicone Substrates

To measure cellular forces, polydimethylsiloxane (PDMS) substrates with different stiffnesses were prepared. In brief, PDMS solutions were supplied by mixing same weight ratio of component A and B of commercial PDMS (NuSil® 8100, NuSil Silicone Technologies) with different concentrations of Sylgard 184 PDMS crosslinking agent (dimethyl, methylhydrogen siloxane, which contains methyl terminated silicon hydride units) to obtain substrates with various stiffnesses. The mechanical properties of the PDMS at different crosslinker concentrations are measured using a parallel plate rheometer (Anton Paar) and calculated the Young's moduli (Table 1). For the experiments, 50 μl of uncured PDMS was applied to the clean 22*22 mm (No.1) glass coverslips and cured at 100° C. for two hours. For traction force microscopy, prepared PDMS substrates were coated with a layer of fiduciary particles using spin coater (WS-650 Spin Processor, Laurell Technologies) and incubated at 100° C. for an hour.

TABLE 1

Young's moduli for PDMS substrates containing different concentrations of Sylgard 184 crosslinking agent

| Additional crosslinker concentration (weight %) | Young's modulus (YM) (kPa) |
|---|---|
| 0.00 | 0.3 ± 0.05 |
| 0.10 | 2.0 ± 0.06 |
| 0.20 | 5.0 ± 0.04 |
| 0.36 | 12.0 ± 0.71 |
| 0.50 | 23.4 ± 1.86 |
| 1.80 | 100.0 ± 2.80 |

Printing on Silicone Substrates using UV Patterning

The silicone substrates were adhesively micropatterned with a UV-patterning system (PRIMO, Alveole Lab, Paris, France). PDMS substrates were incubated with Poly-L-Lysine (PLL, Sigma) solution (5 mg/ml) prepared in 0.1M HEPES buffer (pH 8.5) for 1 hour at room temperature, followed by rinsing with MiliQ water. Positively charged PLL electrostatically adsorbs onto the negatively charged surface of silicone substrates and allows protein attachment after printing. The substrates were then incubated with Polyethylene glycol valeric acid (PEG-SVA, Laysan Bio) prepared in 0.1M HEPES buffer (pH 8.5) for 30 minutes at room temperature, followed by thorough rinsing with phosphate buffer saline (PBS) pH 7. PEG-SVA acts as an antifouling brush layer that repels protein attachment. The substrates were then covered with the UV sensitive photoinitiator solution of PLPP (Alveole Lab, Paris, France) and placed on the stage of a microscope (Nikon Ti2 Eclipse) equipped with the UV-patterning system.

To generate the patterns, open-source graphics software programs, Inkscape and ImageJ, were used to generate binary 8-bit mask image files that were loaded into PRIMO's control software. The desired pattern was generated by a digital micromirror array in the PRIMO system and projected using a 375 nm UV laser with an intensity of 29 mW/mm2 via 20X/0.45 NA objective. The projected pattern results in localized photodegradation of the antifouling PEG-SVA brush, in the shape of the desired pattern. An exposure dose of 20 seconds was adequate to complete photodegradation of the PEG-SVA brush.

Following UV exposure, the substrates were washed with PBS and incubated for 1 hour at room temperature with a mixture of fluorescently labeled bovine serum albumin (BSA, Alexa Fluor™ 555 conjugate, Thermofisher, 5 μg/ml) and fibronectin (40 μg/ml, Sigma Aldrich) in PBS to adsorb the protein to the exposed PLL surface. Excess protein was rinsed off with PBS prior to cell seeding.

Cell Culture and Seeding

Cell lines used in this research: NIH-3T3 (ATCC-CRL1658) mouse fibroblast cells, MDA-MB-231 (ATCC-HTB-26) highly metastatic breast adenocarcinoma cells, MCF-7 (ATCC-HTB-22) low metastatic breast adenocarcinoma cells. All cell lines were cultured in Dulbecco's modified Eagle medium (DMEM) (Wisent) supplemented with 10% fetal bovine serum (FBS) (Wisent) and 1% Penicillin-Streptomycin antibiotic (P/S) (Thermo Fisher). Cells were seeded on the patterns for 1 hour at 37° C. in 5% CO2 environment, followed by a gentle wash with PBS to remove nonattached cells to avoid nonspecific attachments. Cells were further incubated for 16-18 hours (on patterns) before imaging at 37° C. in 5% CO2 environment. For the time-dependent experiments cells were treated with 2 μM Cytochalasin D (Cyto D) in the final hour to depolymerize actin and inhibit cellular forces.

Imaging

After 16-18 hours of cell seeding, cells were stained with cell tracker green CMFDA (Thermofisher) to detect cell boundaries, and the plates were transferred to a lab-built heated stage perfused with 5% CO2 and mounted on a confocal microscope (Leica TCS SP8 with a 10×0.4 NA objective). With this setup, cells were imaged with transmission and fluorescence microscopy for extended periods, while maintaining a controlled culture environment Quantification of Cellular Forces In PaCS, cells are confined on adhesive micropatterns of known area on linearly elastic silicone substrates. Cells deform the silicone substrates along with the arbitrary patterned shapes. During a typical PaCS experiment, the cell deformed pattern area is captured and compared with the initial area to calculate strain energy applied by the cell to deform the underlying elastic silicone substrate. First, the deformed and undeformed pattern area are measured by thresholding the fluorescent pattern images. For all experiments, a single averaged value of undeformed pattern area is used (2402±32 μm$^2$) and compared with the cell deformed pattern area. Then two squares of areas equivalent to that of the initial undeformed and the cell deformed pattern are created, regardless of their initial shape. For example, considering a triangle with an area of 2400 μm$^2$ deforming into a pattern of 2000 μm$^2$, we create two squares of 2400 μm$^2$ and 2000 μm$^2$. We assume that change in pattern area is the key variable and does not depend on shape geometry, based on the linear relationship between change in pattern area and TFM strain energy. A rectangular mesh grid for both deformed and undeformed squares with equal grid sizes is created and use the cross correlation to compare the mesh grids of deformed and undeformed squares to generate a displacement field. This approach is similar to the bead displacement fields quantified using cross correlation in TFM analysis. Thus, the mesh grid size for both the deformed and undeformed patterns was chosen based on the average distance between the TFM beads during a typical TFM experiment (~2.5 μm). After getting displacements, Boussinesq solution is used to the problem of a point force applied on the surface of a half-space to find the traction stresses, similar to all the TFM approaches. Finally, strain energy is calculated by integrating the product of displacement and traction vectors over the pattern area, using the following equation, $$U = \frac{1}{2} \int f u \, dA$$

Where U, A, f and u are strain energy, pattern area, traction stress and displacements respectively. The noise of the measurement is further quantified by calculating cellular forces from undeformed pattern areas on each stiffness substrate.

Apart from this traditional approach, a simplified version of PaCS work equations is introduced which are based on unidirectional tension/compression.

$$U = \tfrac{1}{2} \in \cdot \sigma \cdot V$$

Where, U, ∈, σ and V are strain energy, strain, stress and volume of the substrate. Although the work values from this equation highly correlate with TFM and PaCs, they rely on a thickness (t) which is a fitting parameter that yields the best result and does not reflect the geometry of the substrate. While this simplified approach offers an experimentally more accessible quantification, the selection of a thickness fitting parameter results in values that are quantitatively correct relative to each other, but not necessarily correct in absolute terms, and as such this approximation should be applied with care.

Data Analysis

Cell strain energy was calculated using a custom MATLAB script which requires fluorescent pattern images, substrate stiffness and initial pattern area. The code calculates the pattern area and strain energy values for the respective cells. The code is available on the GitHub repository with experimental details and example data for analysis (https://github.com/ajinkyaghagre/PaCS_matlabcode).

As can be understood, the examples described above and illustrated are intended to be exemplary only. Many alternate embodiments are possible. For instance, the cell or cells can be adhered directly to a corresponding portion of a surface of a substrate which is both adhesive and mechanically characterized, the cell or cells can be laid down randomly, or in a controlled manner, to cover distinct, corresponding portions of the substrate. The cell or cells can then be imaged directly, and make determinations based on the evolution of their surface are over time. In another example, the cell or cells can adhere directly to a corresponding blob or patch of a viscoelastic substrate covering a rigid support such as a glass slide. The occupied surface area of cell or cells can be determined by imaging one or the other, or both, of the blob/patch and of the cell or cells (in the case of the former, we assume that the cell or cells entirely cover the adhesive patch and equate the surface area of the cell to the surface area of the adhesive patch). Accordingly, the scope is indicated by the appended claims.

What is claimed is:

1. A method of measuring cellular forces, the method comprising:
   adhering at least one cell to at least one adhesive surface area of an arrangement, the at least one adhesive surface area being predictively deformable upon cellular forces exerted by said at least one cell;
   acquiring an image of the arrangement;
   measuring, from the image, a surface area of the at least one cell;
   comparing the measured surface area to a reference surface area value; and
   generating a signal indicative of the cellular forces based on said comparison;
   wherein the arrangement further comprises a reference surface area, separated from the adhesive surface area by a portion of said non-adhesive surface area, said first adhesive surface area and said reference surface area having a same surface area value, the method further comprising measuring, from the image, the reference surface area value from the reference surface area.

2. The method of claim 1 wherein said measured surface area is smaller than said reference surface area, and said generating the signal includes generating a signal indicative of cell contractility based on said comparison.

3. The method of claim 1 further comprising said at least one cell exerting cellular forces onto said at least one adhesive surface area and thereby deforming said at least one adhesive surface area over time as a function of the relationship between the predictively deformable mechanical properties of the arrangement and the amplitude and orientation of the cellular forces.

4. The method of claim 3 wherein said exerting cellular forces onto said at least one adhesive surface area includes said adhesive surface area being a surface of a film of adhesive material covering a substrate having said predictively deformable mechanical properties, said exerting includes transferring an entirety of the cellular forces to the substrate via the film of adhesive material.

5. The method of claim 3 wherein said image is a second image, said acquiring an image is performed at a subsequent point in time, further comprising acquiring a first image at a preceding point in time, and measuring, from the first image, the reference surface area.

6. The method of claim 5 wherein the reference surface area corresponds to a surface area of the at least one cell at the preceding point in time.

7. The method of claim 1 wherein the arrangement has a fluorescent label associated to one of the adhesive surface area and a portion of the arrangement immediately surrounding the adhesive surface.

8. The method of claim 1 wherein the arrangement has an obscuring stain associated to one of the adhesive surface area and a portion of the arrangement immediately surrounding the adhesive surface.

9. The method of claim 1 wherein said acquiring includes imaging the arrangement from a side of the at least one cell.

10. The method of claim 1 wherein said acquiring includes imaging the arrangement from a side opposite the at least one cell, and across a transparent support.

11. The method of claim 1 wherein said comparing further includes:
    calculating a difference between the measured surface area and said reference surface area;
    calculating, based on the difference, and further based on a characterization data representing a load vs. deformation mechanical characterization of the adhesive surface area, a value of work performed by the cell; and
    wherein said signal indicative of the cellular forces includes said value of work.

12. The method of claim 11, further comprising characterizing the predictively deformable mechanical characteristics of the at least one adhesive surface area and storing results of said characterization in the form of said characterization data.

13. The method of claim 1 wherein said measuring includes converting a number of pixels associated to the surface area of the at least one cell into a surface area value using calibration data.

14. The method of claim 1 wherein said measuring includes determining a closed perimeter contour of said at least one cell and calculating said surface area based on said contour.

15. The method of claim 1 wherein measuring includes associating pixels of the image which have a brightness above a given threshold to a surface area of the at least one cell.

16. The method of claim 1 wherein measuring includes associating pixels of the image which have a brightness below a given threshold to a surface area of the at least one cell.

17. The method of claim 1 wherein measuring includes associating pixels of the image to a surface area surrounding the at least one cell, and subsequently associating pixels which have not been associated to the surface area surrounding the at least one cell to a surface area of the at least one cell.

18. The method of claim 1 wherein said measuring includes detecting the presence of a marker integrated to the adhesive surface and assuming that the surface area of the at least one cell corresponds to the surface area of the adhesive surface.

19. The method of claim 1 wherein said measuring includes detecting the presence of a marker integrated to the a portion of the arrangement immediately surrounding the adhesive surface, and assuming that the surface area of the at least one cell corresponds to the surface area of the adhesive surface.

20. The method of claim 1 wherein said reference area is a value of the surface area of the at least one cell prior to any said deformation and is stored as data in a non-transitory memory.

* * * * *